(12) United States Patent
Hagari

(10) Patent No.: US 11,085,378 B2
(45) Date of Patent: Aug. 10, 2021

(54) CONTROLLER AND CONTROL METHOD FOR INTERNAL COMBUSTION ENGINE

(71) Applicant: Mitsubishi Electric Corporation, Tokyo (JP)

(72) Inventor: Hideki Hagari, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/257,378

(22) Filed: Jan. 25, 2019

(65) Prior Publication Data

US 2019/0264621 A1    Aug. 29, 2019

(30) Foreign Application Priority Data

Feb. 23, 2018    (JP) .............................. JP2018-030340

(51) Int. Cl.
*F02D 37/02*    (2006.01)
*F02D 11/10*    (2006.01)
(Continued)

(52) U.S. Cl.
CPC ........ *F02D 11/105* (2013.01); *F02D 41/1497* (2013.01); *B60W 10/06* (2013.01);
(Continued)

(58) Field of Classification Search
CPC ..... F02D 2200/0402; F02D 2200/1004; F02D 41/1497; F02D 41/0047; F02D 11/105; B60W 10/06
See application file for complete search history.

(56) References Cited

U.S. PATENT DOCUMENTS 4,969,439 A * 11/1990 Scotson ................ F02P 5/1455
                                                              123/406.23
7,269,495 B2 * 9/2007 Katsumata ............ F02D 35/023
                                                              701/103
(Continued)

FOREIGN PATENT DOCUMENTS

JP    11-351045 A    12/1999
JP    2006-22706 A    1/2006
(Continued)

OTHER PUBLICATIONS

Yoshida Motohiro, et al., "Application of model base calibration in direct injection diesel engine", The Mazda Motor Technical Report, 2006, No. 24, 19 pages.
(Continued)

*Primary Examiner* — Gonzalo Laguarda
(74) *Attorney, Agent, or Firm* — Sughrue Mion, PLLC; Richard C. Turner

(57) ABSTRACT

To provide a controller and a control method for an internal combustion engine capable of calculating a target value of controlled variable of internal combustion engine which realizes the target torque, while reducing the number of
(Continued)

calculations using a torque characteristics function. A controller and a control method for an internal combustion engine calculates ignition sample numbers of ignition corresponding torques corresponding to the respective ignition sample numbers of ignition timings, by using a torque characteristics function relationship in which a relationship between driving condition and output torque is preliminarily set; and calculates an ignition torque approximated curve approximating a relationship between the ignition sample numbers of the ignition timings and the ignition sample numbers of the ignition corresponding torques; and calculates a target ignition timing corresponding to the target torque.

12 Claims, 8 Drawing Sheets

(51) Int. Cl.
*F02D 41/14* (2006.01)
*F02D 41/00* (2006.01)
*B60W 10/06* (2006.01)

(52) U.S. Cl.
CPC .. *F02D 41/0047* (2013.01); *F02D 2200/0402* (2013.01); *F02D 2200/1004* (2013.01)

(56) References Cited

U.S. PATENT DOCUMENTS

| 7,980,221 | B2* | 7/2011 | Baur | B60K 6/48 |
| | | | | 123/406.23 |
| 2006/0142924 | A1 | 6/2006 | Nakagawa et al. | |
| 2019/0264624 | A1* | 8/2019 | Hagari | F02P 5/153 |

FOREIGN PATENT DOCUMENTS

| JP | 2006-183506 A | 7/2006 |
| JP | 2009-281239 A | 12/2009 |
| JP | 2010-14029 A | 1/2010 |
| JP | 4499809 B2 | 7/2010 |
| JP | 5644733 B2 | 12/2014 |

OTHER PUBLICATIONS

Takayuki Okaya, "Machine Learning Professional Series—Deep Learning", Kodansha, 2015, 5 pages.
Communication dated Jul. 23, 2019 from the Japanese Patent Office in application No. 2018-030340.
Communication dated Mar. 5, 2019 by Japanese Patent Office in application No. 2018-030340.
Office Action dated May 25, 2021 in Chinese Application No. 201910120190.3.

* cited by examiner

CONTROLLER AND CONTROL METHOD FOR INTERNAL COMBUSTION ENGINE

INCORPORATION BY REFERENCE

The disclosure of Japanese Patent Application No. 2018-30340 filed on Feb. 23, 2018 including its specification, claims and drawings, is incorporated herein by reference in its entirety.

BACKGROUND

The present disclosure relates to a controller and a control method for an internal combustion engine for controlling the internal combustion engine by setting output torque as control objective.

Recently, a controller and a control method for the internal combustion engine has been proposed to use an output torque of the internal combustion engine which is a physical value acting on vehicle control directly, as a request value of the internal combustion engine output received from a driver and each vehicle system (motor control for hybrid vehicle, transmission control, brake control, traction control, and the like); and to determine air amount, fuel amount, ignition timing, and the like which are controlled variables of the internal combustion engine by setting the output torque as a target value of the internal combustion engine output; and to realize cooperative control and obtain good travel performance by estimating actual output torque based on the actual driving conditions of internal combustion engine and transmitting to each vehicle system.

Although such a control method is generally called torque base control, in this control method, it is important that the actual output torque can be calculated with good accuracy based on the driving conditions of internal combustion engine. If this can be achieved, by inverse calculation of this, target values of the controlled variables of internal combustion engine (for example, a throttle opening degree, an EGR opening degree, an ignition timing, an air-fuel ratio, and the like) can be calculated from the target torque.

For example, in JP 5644733 B, as the target torque in torque base control, there are a low response target torque and a high response target torque which are different in response. In JP 5644733 B, operation of air amount such as throttle control is performed so as to realize the low response target torque, and operation of ignition timing or fuel injection amount is performed so as to realize the high response target torque. In more detail, MBT ignition timing to the driving condition of the internal combustion engine, a thermal efficiency in MBT, a reduction rate of torque to a retard amount from MBT, and the like are stored in many map data; further, correction by an EGR amount and an air-fuel ratio is performed if needed; by combining these, a calculation of actual torque and a control capable of corresponding to a low response target torque and a high response target torque are configured.

Also in JP 4499809 B, there are first target torque for performing a torque control by a throttle opening degree, and second target torque for performing a torque control by ignition timing; and calculation which uses many map data is performed in order to calculate a target intake air amount and a target ignition timing from these target torques.

By the way, as a method to estimate the output torque from the driving condition of the internal combustion engine, besides the above calculation method using the map data, a method adapting a neural network technology like JP H11-351045 A is also proposed, for example. Here, the neural network is the mathematical model which aimed at expressing several characteristics observed in the brain function by simulation on a computer. By making a feedforward propagation type neural network (FNN: Feedforward Neural Network) learn previously using output value to input values as teacher data, it can be used as a general-purpose approximation function which simulates a relation between the input values and the output value which were learned. As a learning method of the neural network, the error back propagation method (back propagation method) is generally known.

SUMMARY

To a mechanism for internal combustion engine control which becomes complex for recent improvement in fuel efficiency, an internal combustion engine control system also becomes complex similarly, and an increase of the adaptation man hours becomes a large problem. As an example of the mechanism for internal combustion engine control which becomes complex, the intake and exhaust VVT (Variable Valve Timing), a variable valve lift, the variable compression ratio, a turbocharger, a swirl control valve, a tumble control valve, and the like are known. In the case of the control method using map data as JP 5644733 B or JP 4499809 B, if the mechanism for internal combustion engine control becomes complex, many map data is required correspondingly, and accordingly, the adaptation man hours also increase. In a viewpoint of an experiment of internal combustion engine necessary for adaptation, a commercially available MBC (Model Based Calibration) tool has been developed in recent years. For example, as shown in "Application of model base calibration in direct injection diesel engine", Motonori Yoshida, the Mazda Motor technical report, No. 24 (2006), in this tool, a test plan of internal combustion engine is planned based on DOE (Design of Experiments), data collection is performed in conjunction with a testing equipment of internal combustion engine, a statistic model of internal combustion engine is created from its result, and a map data used for control based on this model is created.

However, although map data can be created by MBC tool, in order to create many map data, corresponding man hours are required and many man hours are required also for managing its data for every model of the internal combustion engine. Furthermore, if the map data for control is created from the statistic model of MBC tool, since it is considered that the number of parameters of the driving condition of internal combustion engine which can be considered is decreased and accuracy is deteriorated, many man hours are required also for checking of control accuracy using this map data and fine tuning. In this way, in the conventional map control, even though MBC tool is introduced, there is a problem that still enormous adaptation man hours are required.

About the method to estimate the output torque from the driving condition of internal combustion engine using the feedforward propagation type neural network (FNN) like JP H11-351045 A, in the conventional method only with one middle layer, there is a problem that sufficient accuracy cannot be obtained even if FNN is used as the approximation function. In the viewpoint of approximate precision, a method called deep learning is known in recent years. For example, by multi-layering (deep layering) the neural network similar to the conventional one, this method can improve accuracy as the approximation function significantly. While learning could not be well performed due to the vanishing gradient problem and the like in the conventional learning method, learning came to be well performed by developed various learning techniques in recent years. This deep learning is known also as the one method of the artificial intelligence (AI) and the machine learning which attract attention in recent years.

Then, if the output torque is estimated from the driving condition of internal combustion engine using FNN as the approximation function, it is considered that by creating teacher data with MBC tool and learning it, the output torque can be well estimated by minimum adaptation man hours. Furthermore, since a neural network may be used as one of the methods of creating the statistical model of internal combustion engine also in MBC tool, the output torque can also be estimated from the driving condition of internal combustion engine using the statistical model of internal combustion engine itself created by MBC tool, in this case, man hours are further reduced.

However, the output torque is just estimated as it is, the target ignition timing and the target intake air amount which realize the low response target torque and the high response target torque cannot be calculated. For example, as shown in "Machine learning professional series deep learning", Takayuki Okaya, Kodansha, 2015, if an ignition timing or an intake air amount is changed little by little and the output torque is calculated repeatedly using a function such as FNN, a target ignition timing or a target intake air amount which realizes the target torques can be searched. However, if the calculation using the function such as FNN is performed repeatedly, arithmetic load is increased. Especially, if system structure becomes complex and the function such as FNN becomes complex, arithmetic load is increased significantly. Therefore, it is desired to lower the number of calculations using the function such as FNN as much as possible.

Thus, it is desired to provide a controller and a control method for an internal combustion engine capable of calculating a target value of controlled variable of internal combustion engine which realizes the target torque, while reducing the number of calculations using a torque characteristics function and the like which expresses a characteristics of the output torque to driving condition as much as possible.

A first controller for an internal combustion engine according to the present disclosure including:

a plural ignition torque calculation unit that calculates ignition sample numbers of ignition corresponding torques which are the ignition sample numbers of output torques corresponding to the respective ignition sample numbers of ignition timings which are preliminarily set to plural numbers, by using a torque characteristics function in which a relationship between preliminarily set kinds of driving conditions including an ignition timing and the output torque of the internal combustion engine is preliminarily set;

an ignition torque approximated curve calculation unit that calculates an ignition torque approximated curve which is an approximated curve approximating a relationship between the ignition sample numbers of the ignition timings and the ignition sample numbers of the ignition corresponding torques;

an approximated curve ignition calculation unit that calculates the ignition timing corresponding to a target torque which is an output torque required for the internal combustion engine, as a target ignition timing, by using the ignition torque approximated curve; and an ignition control unit that performs energization control to an ignition coil, based on the target ignition timing.

A second controller for an internal combustion engine according to the present disclosure including:

a driving condition detection unit that detects driving conditions of the internal combustion engine including in-cylinder intake air amount information which is information of an air amount taken into a combustion chamber;

a plural intake ignition calculation unit that calculates intake sample numbers of basic values of target ignition timing corresponding to the respective intake sample numbers of the in-cylinder intake air amount informations which are preliminarily set to plural numbers, by using an ignition timing setting function in which a relationship between preliminarily set kinds of driving conditions including the in-cylinder intake air amount information, and the basic value of target ignition timing is a preliminarily set;

a plural intake torque calculation unit that calculates the intake sample numbers of intake ignition corresponding torques which are the intake sample numbers of output torques corresponding to the respective intake sample numbers of the in-cylinder intake air amount informations and the respective intake sample numbers of the basic values of target ignition timing, by using a torque characteristics function in which a relationship between preliminarily set kinds of driving conditions including the in-cylinder intake air amount information and an ignition timing, and the output torque of the internal combustion engine is a preliminarily set;

an intake torque approximated curve calculation unit that calculates an intake torque approximated curve which is an approximated curve approximating a relationship between the intake sample numbers of the in-cylinder intake air amount informations and the intake sample numbers of the intake ignition corresponding torques;

a target intake air amount calculation unit that calculates the in-cylinder intake air amount information corresponding to the target torque which is an output torque required for the internal combustion engine, as a target in-cylinder intake air amount information, by using the intake torque approximated curve; and an intake air amount control unit that controls the air amount taken into the combustion chamber, based on the target in-cylinder intake air amount information.

A first control method for an internal combustion engine according to the present disclosure including:

a plural ignition torque calculation step that calculates ignition sample numbers of ignition corresponding torques which are the ignition sample numbers of output torques corresponding to the respective ignition sample numbers of ignition timings which are preliminarily set to plural numbers, by using a torque characteristics function in which a relationship between preliminarily set kinds of driving conditions including ignition timing and an output torque of the internal combustion engine is preliminarily set;

an ignition torque approximated curve calculation step that calculates an ignition torque approximated curve which is an approximated curve approximating a relationship between the ignition sample numbers of the ignition timings and the ignition sample numbers of the ignition corresponding torques;

an approximated curve ignition calculation step that calculates the ignition timing corresponding to a target torque which is an output torque required for the internal combustion engine, as a target ignition timing, by using the ignition torque approximated curve; and an ignition control step that performs energization control to an ignition coil, based on the target ignition timing.

A second control method for an internal combustion engine according to the present disclosure including:

a driving condition detection step that detects driving conditions of the internal combustion engine including in-cylinder intake air amount information which is information of an air amount taken into a combustion chamber;

a plural intake ignition calculation step that calculates intake sample numbers of basic values of target ignition timing corresponding to the respective intake sample numbers of the in-cylinder intake air amount informations which are preliminarily set to plural numbers, by using an ignition timing setting function in which a relationship between preliminarily set kinds of driving conditions including the in-cylinder intake air amount information, and the basic value of target ignition timing is a preliminarily set;

a plural intake torque calculation step that calculates the intake sample numbers of intake ignition corresponding torques which are the intake sample numbers of output torques corresponding to the respective intake sample numbers of the in-cylinder intake air amount informations and the respective intake sample numbers of the basic values of target ignition timing, by using a torque characteristics function in which a relationship between preliminarily set kinds of driving conditions including the in-cylinder intake air amount information and ignition timing, and the output torque of the internal combustion engine is a preliminarily set;

an intake torque approximated curve calculation step that calculates an intake torque approximated curve which is an approximated curve approximating a relationship between the intake sample numbers of the in-cylinder intake air amount informations and the intake sample numbers of the intake ignition corresponding torques;

a target intake air amount calculation step that calculates the in-cylinder intake air amount information corresponding to the target torque which is an output torque required for the internal combustion engine, as a target in-cylinder intake air amount information, by using the intake torque approximated curve; and an intake air amount control step that controls the air amount taken into the combustion chamber, based on the target in-cylinder intake air amount information.

According to the first controller and the first control method for the internal combustion engine, without performing the calculation using the torque characteristics function repeatedly to search the ignition timing corresponding to the target torque directly, the approximated curve is calculated based on the ignition sample numbers of calculation results of the torque characteristics function, and the ignition timing corresponding to the target torque is calculated using the approximated curve, therefore the calculation using the torque characteristics function can be reduced to the preliminarily set ignition sample numbers.

According to the second controller and the second control method for the internal combustion engine, without performing the calculation using the torque characteristics function and the ignition timing setting function repeatedly to search the charging efficiency corresponding to the target torque directly, the approximated curve is calculated based on the intake sample numbers of calculation results of the torque characteristics function and the ignition timing setting function, and the charging efficiency corresponding to the target torque is calculated using the approximated curve, therefore the calculation using the torque characteristics function and the ignition timing setting function can be reduced to the preliminarily set intake sample numbers.

DETAILED DESCRIPTION OF THE EMBODIMENTS

Embodiment 1

Figure 1:
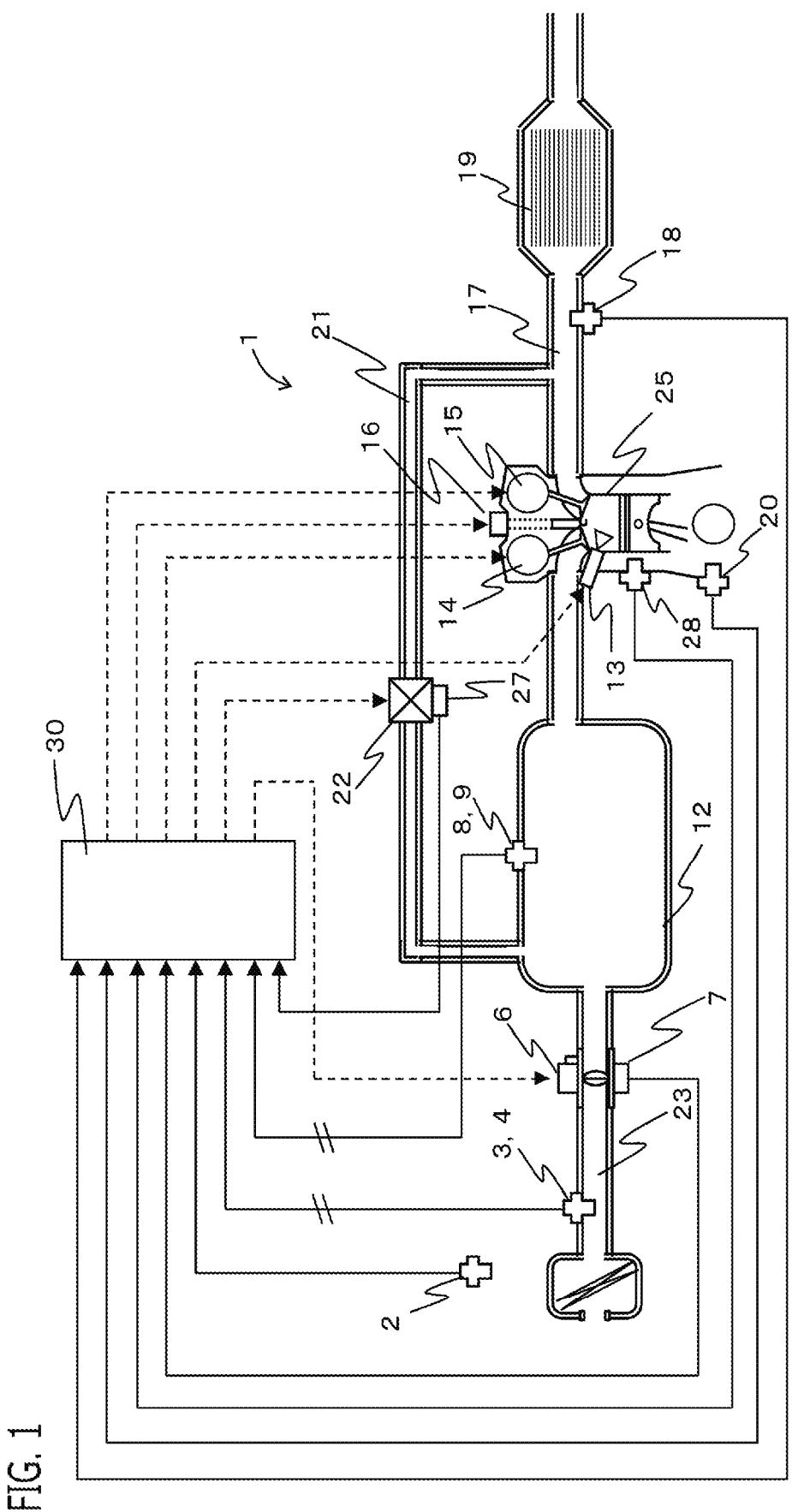
FIG. 1 is a schematic configuration diagram of an internal combustion engine and a controller according to Embodiment 1.
Figure 2:
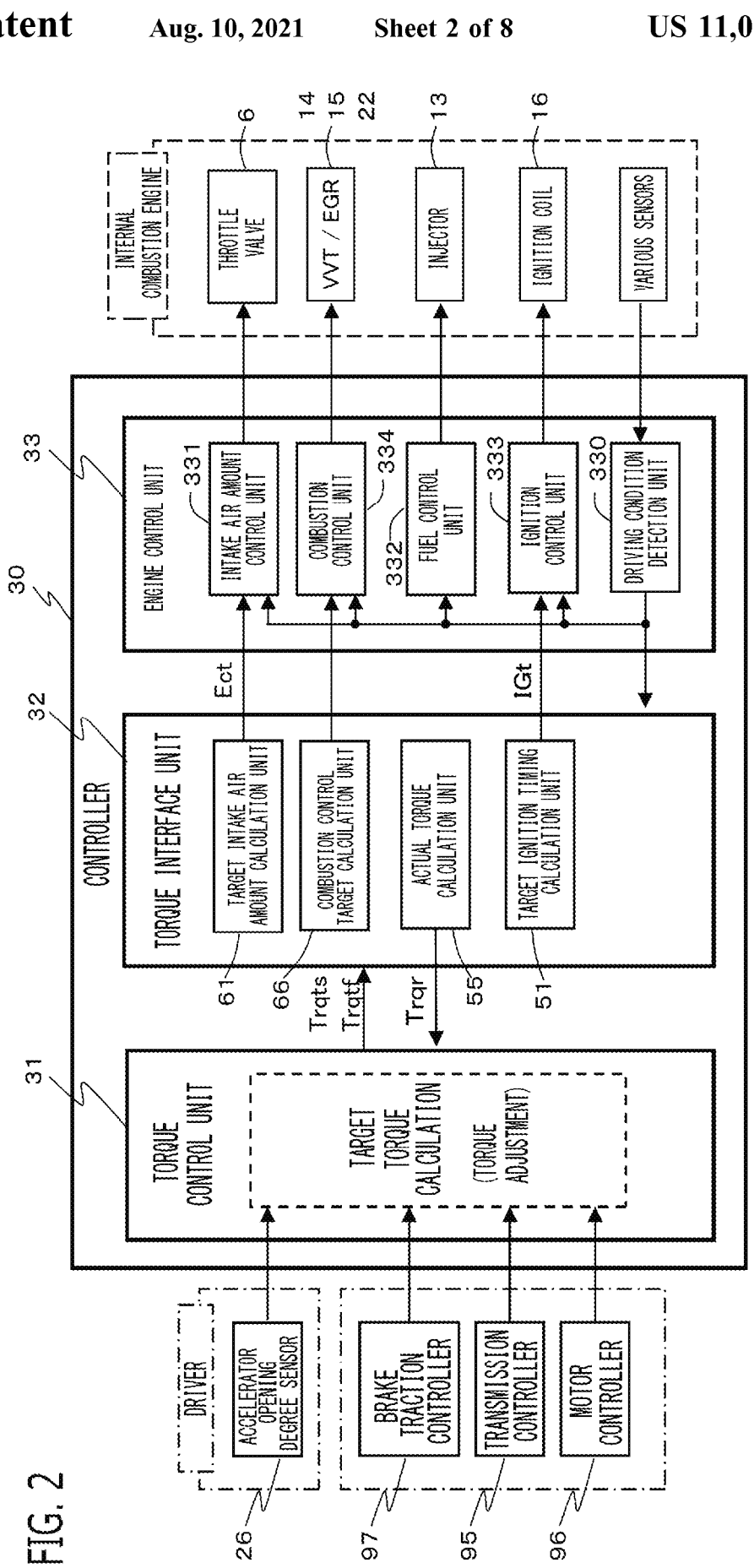
FIG. 2 is a schematic block diagram of a controller according to Embodiment 1.
Figure 3:
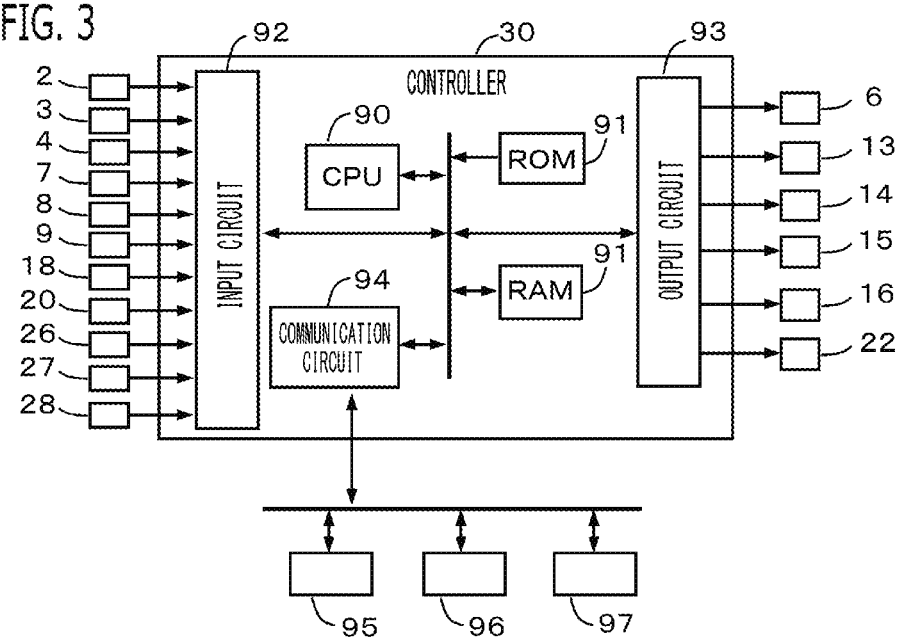
FIG. 3 is a hardware configuration diagram of a controller according to Embodiment 1.

A controller 30 for an internal combustion engine (hereinafter, referred to simply as the controller 30) according to Embodiment 1 will be explained with reference to the drawings. FIG. 1 is a schematic configuration diagram of the internal combustion engine 1, and FIG. 2 is a block diagram of the controller 30 according to Embodiment 1. The internal combustion engine 1 and the controller 30 are mounted in a vehicle; the internal combustion engine 1 functions as a driving-force source for the vehicle (wheels).

1. Configuration of Internal Combustion Engine 1

As shown in FIG. 1, the internal combustion engine 1 is provided with a combustion chamber 25 in which a fuel-air mixture is combusted. The internal combustion engine 1 is provided with an intake pipe 23 for supplying air to the combustion chamber 25 and an exhaust pipe 17 for discharging exhaust gas from the combustion chamber 25. The combustion chamber 25 is configured by a cylinder and a piston. Hereinafter, the combustion chamber 25 is also referred to the cylinder. The internal combustion engine 1 is a gasoline engine. The internal combustion engine 1 has a throttle valve 6 for opening and closing the intake pipe 23. The throttle valve 6 is an electronically controlled throttle valve which is opening/closing-driven by an electric motor controlled by the controller 30. The throttle valve 6 is provided with a throttle opening degree sensor 7 which generates an electric signal according to a throttle opening degree of the throttle valve 6.

In the intake pipe 23 at the upstream side of the throttle valve 6, there are provided an air flow sensor 3 which outputs an electric signal according to an intake air flow rate taken into the intake pipe 23, and an intake air temperature sensor 4 which outputs an electric signal according to a temperature of intake air. The temperature of intake air detected by the intake air temperature sensor 4 can be regarded as equal to an outside air temperature.

The internal combustion engine 1 has an EGR passage 21 which recirculates exhaust gas from the exhaust pipe 17 to the intake manifold 12, and an EGR valve 22 which opens and closes the EGR passage 21. The intake manifold 12 is a part of the intake pipe 23 at the downstream side of the throttle valve 6. The EGR valve 22 is an electronic controlled EGR valve which is opening/closing-driven by an electric motor controlled by controller 30. The EGR valve 22 is provided with an EGR opening degree sensor 27 which outputs an electric signal according to the opening degree of the EGR valve 22. "EGR" is an acronym for Exhaust Gas Recirculation. EGR that the exhaust gas recirculates via the EGR valve 22 is called as external EGR, and EGR that the exhaust gas remains in the combustion chamber by valve overlap of intake and exhaust valves is called as internal EGR. Hereinafter, external EGR is simply called as EGR.

In the intake manifold 12, there are provided a manifold pressure sensor 8 which outputs an electric signal according to a manifold pressure, which is a pressure of gas in the intake manifold 12, and a manifold temperature sensor 9 which outputs an electric signal according to a manifold temperature, which is a temperature of gas in the intake manifold 12.

The internal combustion engine 1 is provided with an injector 13 which supplies fuel to the combustion chamber 25. The injector 13 is provided in such a way as to inject a fuel directly into the combustion chamber 25. The injector 13 may be provided so as to inject fuel to a downstream side part of the intake manifold 12. The internal combustion engine 1 is provided with an atmospheric pressure sensor 2 which outputs an electric signal according to an atmospheric pressure.

An ignition plug for igniting a fuel-air mixture and an ignition coil 16 for supplying ignition energy to the ignition plug are provided on the top of the combustion chamber 25. On the top of the combustion chamber 25, there are provided an intake valve 14 for adjusting an intake air amount to be taken from the intake pipe 23 into the combustion chamber 25 and an exhaust valve 15 for adjusting an exhaust gas amount to be exhausted the combustion chamber 25 to the exhaust pipe 17. The intake valve 14 is provided with an intake variable valve timing mechanism which makes the opening and closing timing thereof variable. The exhaust valve 15 is provided with an exhaust variable valve timing mechanism which makes the opening and closing timing thereof variable. Each of the variable valve timing mechanisms 14, 15 has an electric actuator. On the crankshaft of the internal combustion engine 1, there is provided a crank angle sensor 20 for generating an electric signal according to the rotation angle thereof. A knock sensor 28 is fixed to the cylinder block.

In the exhaust pipe 17, there is provided an air-fuel ratio sensor 18 which generates an electric signal according to an air-fuel ratio AF, which is the ratio of air to fuel in exhaust gas. A catalyst 19 for purifying exhaust gas is also provided in the exhaust pipe 17.

2. Configuration of Controller 30

Next, the controller 30 will be explained. The controller 30 is a controller whose control subject is the internal combustion engine 1. As shown in the block diagram of FIG. 2, the controller 30 is provided with control units such as a torque control unit 31, a torque interface unit 32, and an engine control unit 33. The respective control units 31 to 33 and the like of the controller 30 are realized by processing circuits included in the controller 30. Specifically, as shown in FIG. 2, the controller 30 includes, as processing circuits, an arithmetic processor (computer) 90 such as a CPU (Central Processing Unit), storage apparatuses 91 which exchange data with the arithmetic processor 90, an input circuit 92 which inputs external signals to the arithmetic processor 90, an output circuit 93 which outputs signals from the arithmetic processor 90 to the outside, a communication circuit 94, and the like.

As the arithmetic processor 90, ASIC (Application Specific Integrated Circuit), IC (Integrated Circuit), DSP (Digital Signal Processor), FPGA (Field Programmable Gate Array), various kinds of logical circuits, various kinds of signal processing circuits, and the like may be provided. As the arithmetic processor 90, a plurality of the same type ones or the different type ones may be provided, and each processing may be shared and executed. As the storage apparatuses 91, there are provided a RAM (Random Access Memory) which can read data and write data from the arithmetic processor 90, a ROM (Read Only Memory) which can read data from the arithmetic processor 90, and the like. The input circuit 92 is connected with various kinds of sensors and switches and is provided with an A/D converter and the like for inputting output signals from the sensors and the switches to the arithmetic processor 90. The output circuit 93 is connected with electric loads and is provided with a driving circuit and the like for outputting a control signal from the arithmetic processor 90.

The communication circuit 94 is connected with external controllers, such as a transmission controller 95 which controls a transmission, a motor controller 96 which controls a motor provided in the hybrid vehicle, and a brake traction controller 97 which performs brake control and traction control, through a communication wire, and performs cable communication based on a communication protocol such as the CAN (Controller Area Network).

Then, the arithmetic processor 90 runs software items (programs) stored in the storage apparatus 91 such as a ROM and collaborates with other hardware devices in the controller 30, such as the storage apparatus 91, the input circuit 92, and the output circuit 93, so that the respective functions of the control units 31 to 33 included in the controller 50 are realized. Setting data items such as each function and constants to be utilized in the control units 31 to 33 are stored, as part of software items (programs), in the storage apparatus 91 such as a ROM.

In the present embodiment, the input circuit 92 is connected with the atmospheric pressure sensor 2, the air flow sensor 3, the intake air temperature sensor 4, the throttle position sensor 7, the manifold pressure sensor 8, the manifold temperature sensor 9, the air-fuel ratio sensor 18, the crank angle sensor 20, the accelerator opening degree sensor 26, the EGR opening degree sensor 27, the knock sensor 28, and the like. The output circuit 93 is connected with the throttle valve 6 (electric motor), the injector 13, the intake variable valve timing mechanism 14, the exhaust variable valve timing mechanism 15, the ignition coil 16, the EGR valve 22 (the electric actuator), and the like. The controller 30 is connected with various kinds of unillustrated sensors, switches, actuators, and the like.

2-1. Torque Base Control

The controller 30 performs torque base control that controls the internal combustion engine 1 based on a target torque. The controller 30 is provided with the torque control unit 31, the torque interface unit 32, and the engine control unit 33 schematically, as mentioned above. The torque control unit 31 calculates the target torque. The torque interface unit 32 calculates target values of controlled variables of the internal combustion engine based on the target torque. The engine control unit 33 performs driving control of various kinds of electric loads based on the target values of controlled variables.

<Torque Control Unit 31>

The torque control unit 31 calculates a driver request torque which is an output torque that a driver requires on the internal combustion engine 1, based on the actual accelerator opening degree detected by the accelerator opening degree sensor 26. The torque control unit 31 calculates an idling torque which is an output torque necessary for maintaining rotational speed at idling operation. The torque control unit 31 calculates an external request torque which is an output torque required from the external controllers such as the transmission controller 95, the motor controller 96, and the brake traction controller 97. Then, the torque control unit 31 calculates the target torque by determining the priority among the driver request torque, the idling torque, and the external request torque (such calculation is also called as torque adjustment).

Here, the target torque contains a low response target torque Trqts and a high response target torque Trqtf. The low response target torque Trqts is an output torque required for the internal combustion engine without considering retarding the ignition timing; and the high response target torque Trqtf is an output torque required for the internal combustion engine including retarding the ignition timing. Normally, although the low response target torque Trqts and the high response target torque Trqtf coincide with each other, when there is a torque down request by retarding ignition timing, the high response target torque Trqtf becomes lower than the low response target torque Trqts.

The torque control unit 31 mainly calculates the low response target torque Trqts based on the larger one of the driver request torque and the idling torque in a steady state, and calculates the high response target torque Trqtf based on the external request torque and the idling torque at load change.

<Torque Interface Unit 32>

The torque interface unit 32 performs interconversion between the target torque and the charging efficiency, and interconversion between the target torque and the ignition timing, based on the driving conditions of the internal combustion engine; and calculates a target charging efficiency Ect and a target ignition timing IGt to transmit to the engine control unit 33. The torque interface unit 32 calculates an actual output torque Trqr based on the driving conditions of the internal combustion engine to transmit to the torque control unit 31. Detailed processing of the torque interface unit 32 is described below.

<Driving Condition Detection Unit 330>

The engine control unit 33 is provided with a driving condition detection unit 330 that detects the driving conditions of the internal combustion engine. The driving condition detection unit 330 detects various kinds of driving conditions, based on the output signals of various kinds of sensors and the like. Specifically, the driving condition detection unit 330 detects actual an atmospheric pressure based on the output signal of the atmospheric pressure sensor 2; detects an actual intake air flow rate based on the output signal of the air flow sensor 3; detects an actual outside air temperature based on the output signal of the intake air temperature sensor 4; detects an actual throttle opening degree based on the output signal of the throttle position sensor 7; detects an actual manifold pressure based on the output signal of the manifold pressure sensor 8; detects an actual manifold temperature which is a temperature of gas in the intake manifold 12 based on the output signal of the manifold temperature sensor 9 and the like; detects an actual air fuel ratio of exhaust gas based on the output signal of the air-fuel ratio sensor 18; detects an actual accelerator opening degree based on the output signal of the accelerator opening degree sensor 26; and detects an actual EGR opening degree based on the output signal of an EGR opening degree sensor 27.

The driving condition detection unit 330 detects a crank angle and an actual rotational speed Ner based on the output signal of the crank angle sensor 20. The driving condition detection unit 330 detects an actual phase angle IVTr of the intake variable valve timing mechanism 14 (hereinafter, referred to as the intake VVT 14) and an actual phase angle EVTr of the exhaust gas variable valve timing mechanism 15 (hereinafter, referred to as the exhaust VVT 15), based on a phase difference between edge of a cam angle sensor (unillustrated) and the crank angle θd.

The driving condition detection unit 330 detects an in-cylinder intake air amount information which is information of an air amount taken into the combustion chamber 25. The driving condition detection unit 330 calculates an actual intake air amount [g/stroke] taken into the combustion chamber 25 and an actual charging efficiency Ecr [%] as the in-cylinder intake air amount information, based on the actual intake air flow rate, the actual rotational speed Ner, and the like. For example, the driving condition detection unit 330 calculates, as the actual intake air amount [g/stroke], a value obtained by applying filter processing which simulates a delay in the intake manifold to a value obtained by multiplying a stroke period according to the rotational speed Ne to the actual intake air flow rate [g/s]. Alternatively, the driving condition detection unit 330 may calculate the actual intake air amount [g/stroke] and the actual charging efficiency Ecr [%], based on the actual manifold pressure, the actual rotational speed Ner, and the like.

The driving condition detection unit 330 calculates an actual EGR amount [g/stroke] which is an actual exhaust gas recirculation amount taken into the combustion chamber 25, based on the EGR opening degree and the like. For example, the driving condition detection unit 330 calculates an actual EGR flow rate [g/s] which passes the EGR valve 22, based on the EGR opening degree, the manifold pressure, and the like; and calculates, as the actual EGR amount [g/stroke], a value obtained by applying filter processing to a value obtained by multiplying the stroke period to the actual EGR flow rate. The driving condition detection unit 330 calculates an actual EGR rate Regrr [%] which is a ratio of the actual EGR amount to the actual intake air amount.

<Intake Air Amount Control Unit 331>

The engine control unit 33 is provided with an intake air amount control unit 331 that controls intake air amount. The intake air amount control unit 331 calculates a target intake air amount from the target charging efficiency Ect, and calculates a target intake air flow rate from the target intake air amount. The engine control unit 33 calculates a target throttle opening degree based on the actual intake air flow rate and the actual manifold pressure so as to achieve the target intake air flow rate, and performs driving control of the electric motor of the throttle valve 6.

<Combustion Control Unit 334>

Figure 10:
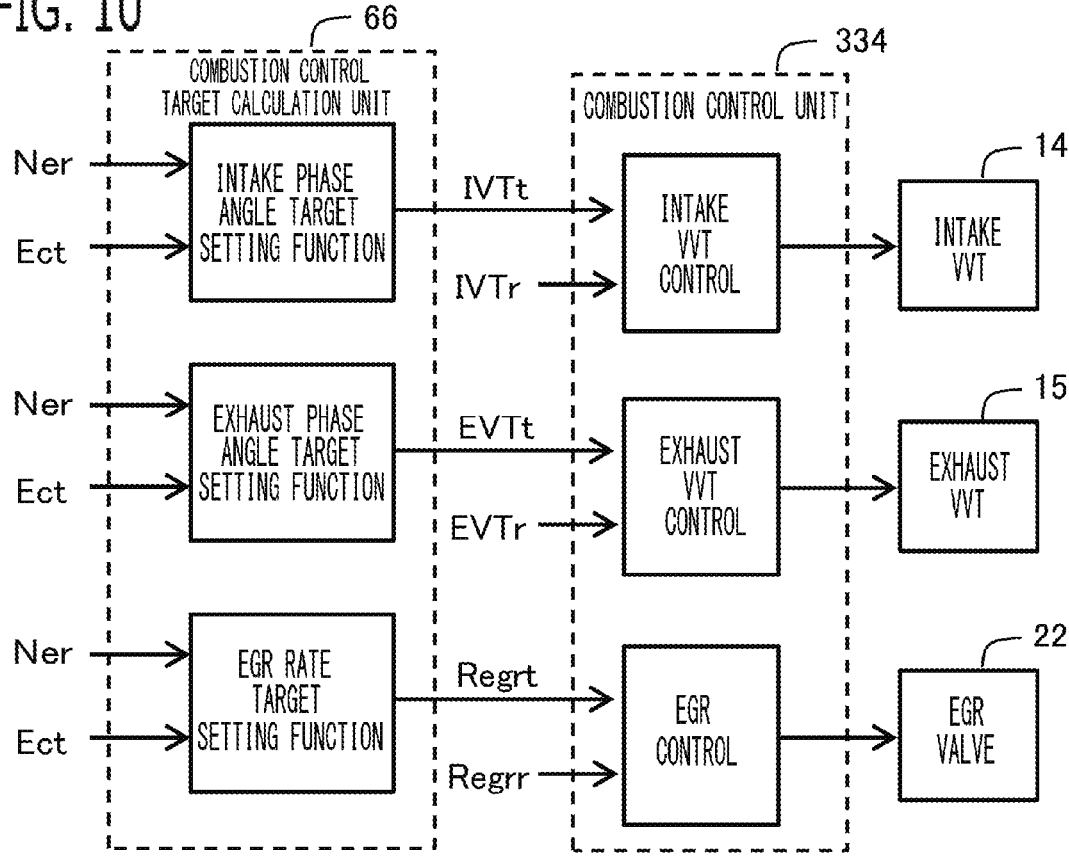
FIG. 10 is a block diagram for explaining processing of a combustion control target calculation unit and a combustion control unit according to Embodiment 1.

The engine control unit 33 is provided with a combustion control unit 334 that controls combustion operation mechanism for operating combustion state. In the present embodiment, the combustion operation mechanism is set to the EGR valve 22, the intake VVT 14, and the exhaust VVT 15. The combustion control unit 334 performs driving control of each combustion operation mechanism based on the target value of each combustion control state transmitted from the combustion control target calculation unit 66 described below, as shown in FIG. 10. The combustion control unit 334 calculates a target EGR opening degree so as to achieve the target EGR rate Regrt, and performs driving control of the electric actuator of the EGR valve 22. The combustion control unit 334 performs driving control of the electric actuator of the intake VVT 14 so as to achieve the target phase angle IVTt of the intake VVT 14 (hereinafter, referred to as the target intake phase angle IVTt). The combustion control unit 334 performs driving control of the electric actuator of the exhaust VVT 15 so as to achieve the target phase angle EVTt of the exhaust VVT 15 (hereinafter, referred to as the target exhaust phase angle EVTt.

<Fuel Control Unit 332>

The engine control unit 33 is provided with a fuel control unit 332 that controls fuel injection amount. The fuel control unit 332 calculates a fuel injection amount for achieving a target air fuel ratio based on the actual charging efficiency Ecr, and performs driving control of the injector 13.

<Ignition Control Unit 333>

The engine control unit 33 is provided with an ignition control unit 333 that performs energization to the ignition coil. The ignition control unit 333 determines a final ignition timing SA based on the target ignition timing IGt transmitted from the torque interface unit 32. When knock is detected by the knock sensor 28, the ignition control unit 333 calculates the final ignition timing SA by performing retard angle correction to the target ignition timing IGt so as not to cause knock. The ignition control unit 333 performs retard angle limitation that limits the ignition timing of retard side by a retard limit ignition timing IGrtd so that the final ignition timing SA is not set to retard side rather than the retard limit ignition timing IGrtd for preventing misfire. Then, the ignition control unit 333 performs energization control to the ignition coil 16 based on the final ignition timing SA. This final ignition timing SA becomes an actual ignition timing SA.

2-2. Detailed Configuration of Torque Interface Unit 32

As mentioned above, the torque interface unit 32 performs interconversion between the target torque and the charging efficiency, and interconversion between the target torque and the ignition timing, based on the driving conditions of the internal combustion engine, and calculates a target charging efficiency Ect and a target ignition timing IGt. For that purpose, a torque characteristics function and an ignition timing setting function which are explained below are stored in the storage apparatus 91.

2-2-1. Ignition Timing Setting Function

The torque interface unit 32 stores the ignition timing setting function in which a relationship between preliminarily set kinds of driving conditions and a basic value of target ignition timing IGb is preliminarily set. In a driving condition where knock does not occur at a MBT ignition timing IGmbt (MBT: Minimum advance for the Best Torque) which is an ignition timing when the output torque becomes the maximum, the basic value of target ignition timing IGb is set to the MBT ignition timing IGmbt; and in a driving condition where knock occurs at the MBT ignition timing IGmbt, the basic value of target ignition timing IGb is set to a knock limit ignition timing IGknk which is a limit ignition timing of advance side when knock starts to occur.

The ignition timing setting function is a function in which a relationship between preliminarily set kinds of driving conditions including the charging efficiency Ec and the basic value of target ignition timing IGb is preliminarily set. The driving conditions which influence on the ignition timing when the output torque becomes the maximum change on the system structure of the internal combustion engine 1. In the present embodiment, the ignition timing setting function is a function in which a relationship between driving conditions of the rotational speed Ne, the charging efficiency Ec, the intake phase angle IVT, the exhaust phase angle EVT, and the EGR rate Regr, and the basic value of target ignition timing IGb is preliminarily set.

<Neural Network>

Figure 4:
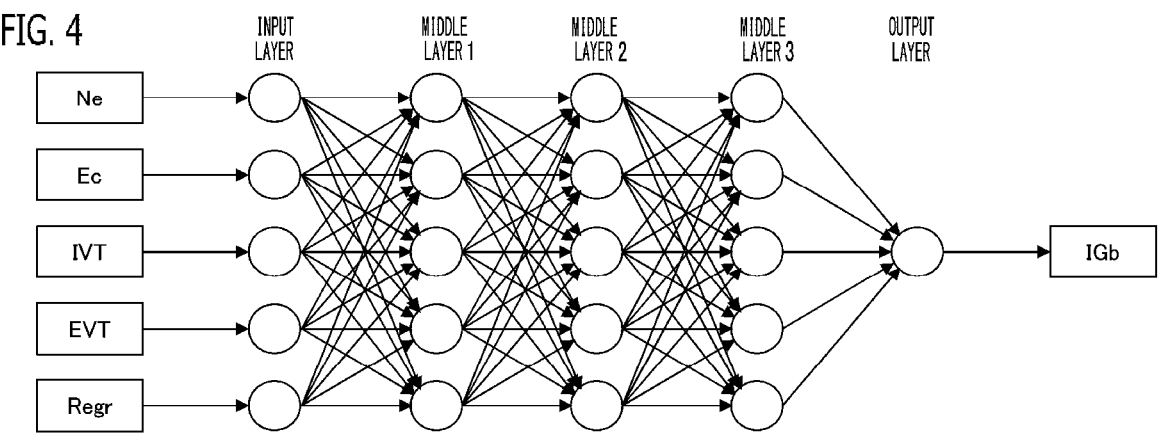
FIG. 4 is a figure showing an ignition timing setting function configured by FNN according to Embodiment 1.

When the system structure of the internal combustion engine 1 becomes complex, the ignition timing setting function becomes a complex function with many input variables. In the present embodiment, as shown in FIG. 4, the ignition timing setting function is configured by a feedforward propagation type neural network (FNN: Feedforward Neural Network). FNN has a structure in which units (also called as node, neuron) arranged in a hierarchical manner are connected between adjoining layers, and is a network configured so that information propagates from input side toward output side. In the calculation performed in the unit, weights are applied and biases are added to values inputted from respective units in a former layer, and then these become a total input to this unit; and this total input is inputted into an activation function, and its output becomes an output of the unit.

In order to use FNN configured by such units as approximation function, it is necessary to adjust the weights and the biases of each unit so that the input values to FNN and its output value become desired relationship. Many data sets of the input values and the output value which are called teacher data are previously prepared for this adjustment, and it is performed by applying a method called error back propagation method (back-propagation method). To adjust weights and biases in this way is called as learning of neural network; and when learning is performed well, FNN can be used as a general-purpose function which memorized the feature of teacher data.

Although it is considered that approximate precision is improved, as the number of layers of FNN becomes larger and the number of units included in a layer becomes larger; accuracy may be extremely deteriorated in different points from teacher data depending on the condition of learning (this is called as over learning or excess adaptation); in such a case, it is necessary to adjust so as to obtain necessary approximate precision by stopping learning on the way to suppress over learning, and by increasing the number of teacher data. Although the above is an outline of FNN, since FNN and its learning method are well-known technology as explained in "Machine learning professional series deep learning", Takayuki Okaya, Kodansha, 2015, above-mentioned FNN is explained as well-known.

In an example shown in FIG. 4, as the configuration of FNN, five parameters of the rotational speed Ne, the charging efficiency Ec, the intake phase angle IVT, the exhaust phase angle EVT, and the EGR rate Regr are inputted into the input layer; there are three middle layers of which has five units; and the basic value of target ignition timing IGb is outputted from the output layer. This configuration is exemplary, it may be configured so that environmental conditions, such as the intake-air temperature, the atmospheric pressure, and the manifold temperature, are inputted, and it may be configured so that the other driving conditions of the internal combustion engines such as the air-fuel ratio AF are inputted. If the system structure of the internal combustion engine is different, it may be configured so that the driving conditions of its system structure (for example, a variable valve lift, a variable compression ratio, and the like) are inputted. Also about middle layers, the number of units of each layer and the number of layers itself may be increased or decreased. These are the parameters which should be adjusted depending on approximate precision at learning of FNN performed beforehand.

Here, the example in which the basic value of target ignition timing IGb is directly calculated by one FNN is shown. However, two FNN of FNN for calculation of the MBT ignition timing IGmbt and FNN for calculation of the knock limit ignition timing IGknk may be provided; the MBT ignition timing IGmbt and the knock limit ignition timing IGknk are calculated by each FNN; and the ignition timing at the retard side out of these two ignition timings may be calculated as the basic value of target ignition timing IGb.

2-2-2. Torque Characteristics Function

The torque interface unit 32 stores the torque characteristics function in which a relationship between preliminarily set kinds of driving conditions and the output torque Trq is preliminarily set. Then, the torque interface unit 32 calculates the target values of controlled variables which realize the target torque, by using the torque characteristics function.

The torque characteristics function is a function in which a relationship between preliminarily set kinds of driving conditions including ignition timing IG and the output torque Trq is preliminarily set. The driving conditions which influence on the output torque change depending on the system structure of the internal combustion engine 1. In the present embodiment, the torque characteristics function is a function in which a relationship between driving conditions of the rotational speed Ne, the charging efficiency Ec, the intake phase angle IVT, the exhaust phase angle EVT, the EGR rate Regr, and the ignition timing IG, and the output torque Trq is preliminarily set.

When the system structure of the internal combustion engine 1 becomes complex, the torque characteristics function becomes a complex with many input variables. In the present embodiment, as shown in FIG. 5, the torque characteristics function is configured by the feedforward propagation type neural network (FNN).

Figure 5:
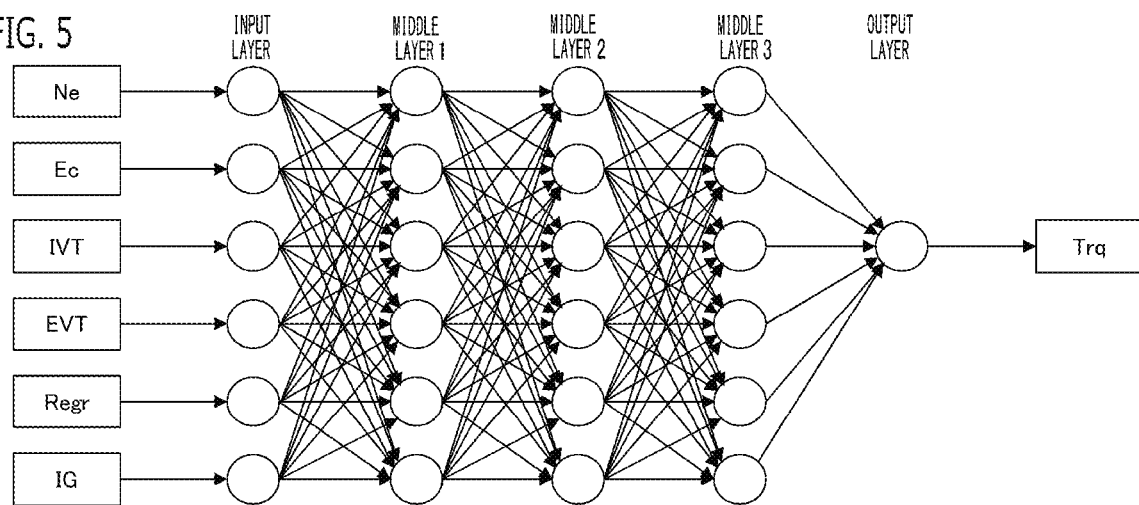
FIG. 5 is a figure showing a torque characteristics function configured by FNN according to Embodiment 1.

In an example shown in FIG. 5, as the configuration of FNN, six parameters of the rotational speed Ne, the charging efficiency Ec, the intake phase angle IVT, the exhaust phase angle EVT, the EGR rate Regr, and the ignition timing IG are inputted into the input layer; there are three middle layers each of which has six units; and the output torque Trq is outputted from the output layer.

This configuration is exemplary, it may be configured so that environmental conditions, such as the intake-air temperature, the atmospheric pressure, and the manifold temperature, are inputted, and it may be configured so that the other driving conditions of the internal combustion engines such as the air-fuel ratio AF are inputted. If the system structure of the internal combustion engine is different, it may be configured so that the driving conditions of its system structure (for example, a variable valve lift, a variable compression ratio, and the like) are inputted. Also about middle layers, the number of units of each layer and the number of layers itself may be increased or decreased. These are the parameters which should be adjusted depending on approximate precision at learning of FNN performed beforehand.

Here, the example in which the output torque Trq is directly calculated by FNN is shown. However, an indicated mean effective pressure or a thermal efficiency may be calculated by FNN; and the output torque Trq may be calculated by multiplying a stroke volume and the like to the indicated mean effective pressure, or the output torque Trq may be calculated by multiplying a heat amount of fuel and the like to the thermal efficiency.

2-2-3. Calculation of Actual Output Torque Trqr

The torque interface unit 32 is provided with an actual torque calculation unit 55 that calculates an actual output torque Trqr. The actual torque calculation unit 55 calculates the actual output torque Trqr which is the output torque corresponding to the present driving conditions (in this example, the actual rotational speed Ner, the actual charging efficiency Ecr, the actual intake phase angle IVTr, the actual exhaust phase angle EVTr, the actual EGR rate Regrr, and the actual ignition timing SA), by using the torque characteristics function. The calculated actual output torque Trqr is transmitted to the torque control unit 31.

2-2-4. Calculation of Target Ignition Timing IGt

The torque interface unit 32 is provided with a target ignition timing calculation unit 51 that calculates a target ignition timing IGt. In the present embodiment, as shown in a next equation and FIG. 6, when the high response target torque Trqtf coincides with the low response target torque Trqts and there is no torque down request by retarding ignition timing, the target ignition timing calculation unit 51 calculates the basic value of target ignition timing IGb corresponding to the present driving conditions, as the target ignition timing IGt; and when the high response target torque Trqtf is lower than the low response target torque Trqts and there is a torque down request by retarding ignition timing, the target ignition calculation unit 51 calculates a target torque corresponding ignition timing IGtt corresponding to the high response target torque Trqtf, as the target ignition timing IGt.

1)

When $Trqtf = Trqts$ $IGt = IGb$

2)

When $Trqtf < Trqts$ $IGt = IGtt$ \hfill (1)

2-2-4-1. Calculation of Basic Value of Target Ignition Timing IGb

The target ignition timing calculation unit 51 calculates the basic value of target ignition timing IGb corresponding to the driving conditions (in this example, the actual rotational speed Ner, the actual charging efficiency Ecr, the actual intake phase angle IVTr, the actual exhaust phase angle EVTr, and the actual EGR rate Regrr), by using the ignition timing setting function.

2-2-4-2. Calculation of Target Torque Corresponding Ignition Timing

The target ignition timing calculation unit 51 calculates the target torque corresponding ignition timing IGtt which realizes the target torque. In the present embodiment, the target ignition timing calculation unit 51 calculates the target torque corresponding ignition timing IGtt which realize the high response target torque Trqtf which is the output torque required for the internal combustion engine including retarding ignition timing.

If the ignition timing IG is changed little by little and the output torque Trq is calculated repeatedly using the torque characteristics function, the ignition timing IG which realizes the high response target torque Trqtf can be searched. However, if the calculation using the torque characteristics function is performed repeatedly, arithmetic load is increased. Especially, if system structure becomes complex and the torque characteristics function becomes complex, arithmetic load is increased significantly. Therefore, it is desired to lower the number of calculations using the torque characteristics function as much as possible.

Figure 6:
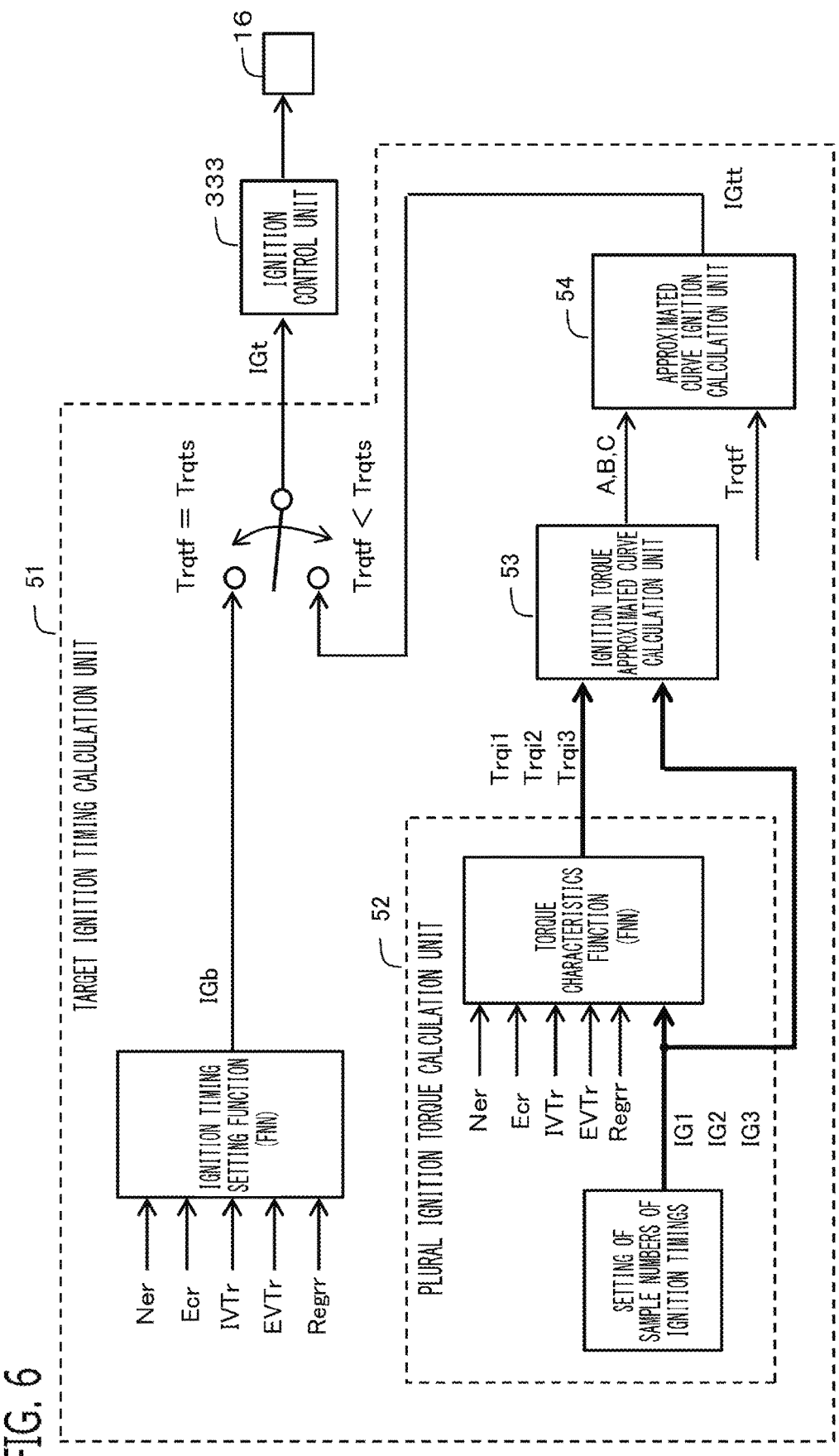
FIG. 6 is a block diagram for explaining calculation processing of a target ignition timing according to Embodiment 1.

Then, as shown in FIG. 6, the target ignition timing calculation unit 51 is provided with a plural ignition torque calculation unit 52, an ignition torque approximated curve calculation unit 53, and an approximated curve ignition calculation unit 54. The plural ignition torque calculation unit 52 calculates ignition sample numbers of ignition corresponding torques Trqi1, Trqi2 ... which are the ignition sample numbers of output torques corresponding to the respective ignition sample numbers of ignition timings IG1, IG2 ... which are preliminarily set to plural numbers, by using the torque characteristics function.

The ignition torque approximated curve calculation unit 53 calculates an ignition torque approximated curve which is an approximated curve approximating a relationship between the ignition sample numbers of the ignition timings IG1, IG2 ... and the ignition sample numbers of the ignition corresponding torques Trqi1, Trqi2 .... The approximated curve ignition calculation unit 54 calculates the ignition timing corresponding to the target torque (in this example, the high response target torque Trqtf), as the target torque corresponding ignition timing IGtt, by using the ignition torque approximated curve.

According to this configuration, without performing the calculation using the torque characteristics function repeatedly to search the ignition timing corresponding to the target torque directly, the approximated curve is calculated based on the ignition sample numbers of calculation results of the torque characteristics function, and the ignition timing corresponding to the target torque is calculated using the approximated curve, therefore the calculation using the torque characteristics function can be reduced to the preliminarily set ignition sample numbers.

<Setting of Three Ignition Sample Numbers of Ignition Timings>

In the present embodiment, a case where the ignition sample numbers is set to three will be explained. That is to say, the calculation using the torque characteristics function is performed for each of the first sample of ignition timing IG1, the second sample of ignition timing IG2, and the third sample of ignition timing IG3, and the first sample of ignition corresponding torque Trqi1, the second sample of ignition corresponding torque Trqi2, and the third sample of ignition corresponding torque Trqi3 are calculated.

The plural ignition torque calculation unit 52 sets the first sample of ignition timing IG1, the second sample of ignition timing IG2, and the third sample of ignition timing IG3, to mutually different values within a combustible range. For example, as shown in a next equation, the plural ignition torque calculation unit 52 sets the first sample of ignition timing IG1 to the basic value of target ignition timing IGb, sets the third sample of ignition timing IG3 to the retard limit ignition timing IGrtd which is a setting limit of the ignition timing on the retard side, and sets the second sample of ignition timing IG2 to an intermediate value between the basic value of target ignition timing IGb and the retard limit ignition timing IGrtd.

$$IG1 = IGb, IG3 = IGrtd, IG2 = \frac{IGb + IGrtd}{2} \quad (2)$$

<Calculation of Three Ignition Sample Numbers of Ignition Corresponding Torques>

The plural ignition torque calculation unit 52 calculates the first sample of ignition corresponding torque Trqi1 which is the output torque corresponding to the actual rotational speed Ner, the actual charging efficiency Ecr, the actual intake phase angle IVTr, the actual exhaust phase angle EVTr, the actual EGR rate Regrr, and the first sample of ignition timing IG1, by using the torque characteristics function. Next, the plural ignition torque calculation unit 52 calculates the second sample of ignition corresponding torque Trqi2 which is the output torque corresponding to the actual rotational speed Ner, the actual charging efficiency Ecr, the actual intake phase angle IVTr, the actual exhaust phase angle EVTr, the actual EGR rate Regrr, and the second sample of ignition timing IG2, by using the torque characteristics function. Then, the plural ignition torque calculation unit 52 calculates the third sample of ignition corresponding torque Trqi3 which is the output torque corresponding to the actual rotational speed Ner, the actual charging efficiency Ecr, the actual intake phase angle IVTr, the actual exhaust phase angle EVTr, the actual EGR rate Regrr, and the third sample of ignition timing IG3, by using the torque characteristics function.

<Calculation of Ignition Torque Approximated Curve>

Figure 7:
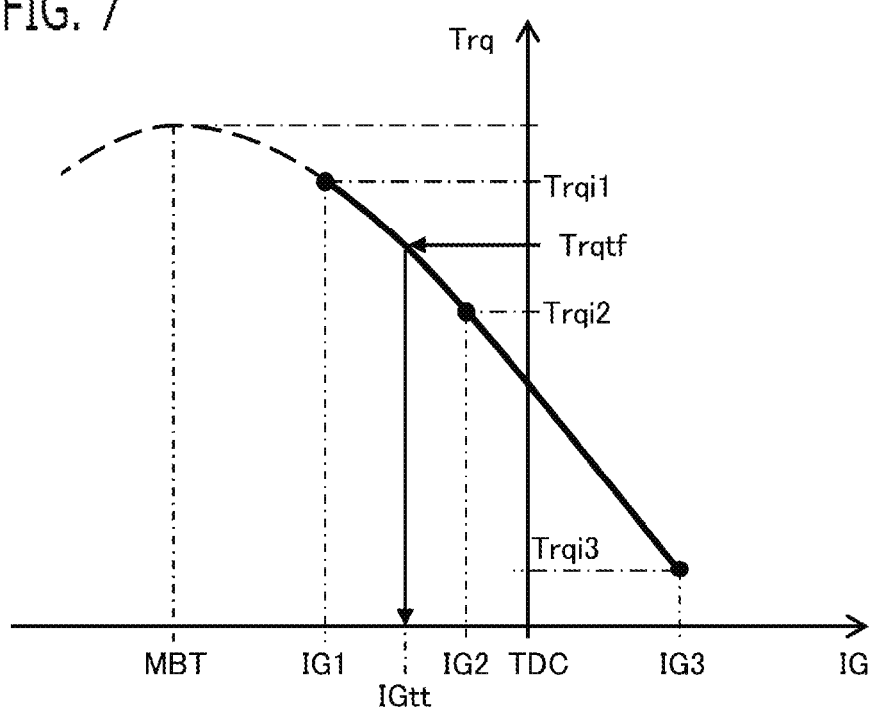
FIG. 7 is a figure for explaining an ignition torque approximated curve according to Embodiment 1.

The relationship between the first sample to the third sample of ignition timings IG1, IG2, IG3, and the first sample to the third sample of ignition corresponding torques Trqi1, Trqi2, Trqi3 is shown in FIG. 7. Generally, if the driving conditions other than the ignition timing are the same, it is considered that the relationship between the ignition timing and the torque can be approximated by a quadratic function (see the paragraph 0032 and the like of JP 4499809 B).

Then, in the present embodiment, the ignition torque approximated curve is set to a quadratic function as shown in a next equation. The ignition torque approximated curve calculation unit 53 calculates coefficients A, B, C of respective terms of the ignition torque approximated curve which is set to the quadratic function, based on the ignition sample numbers of the ignition timings IG1, IG2 ... and the ignition sample numbers of the ignition corresponding torques Trqi1, Trqi2 ....

$$Trq = A \times IG^2 + B \times IG + C \quad (3)$$

In this quadratic function, if there are three points of relationship between the ignition timing IG and the output torque Trq, the three coefficients A, B, C can be calculated by substituting these to the equation (3) respectively and solving simultaneous equations. For example, the ignition torque approximated curve calculation unit 53 calculates the three coefficients A, B, C using a next equation.

$$\begin{bmatrix} A \\ B \\ C \end{bmatrix} = \begin{bmatrix} IG1^2 & IG1 & 1 \\ IG2^2 & IG2 & 1 \\ IG3^2 & IG3 & 1 \end{bmatrix}^{-1} \begin{bmatrix} Trqi1 \\ Trqi2 \\ Trqi3 \end{bmatrix} \quad (4)$$

The ignition sample numbers may be preliminarily set to four or more numbers, four or more points of the relationship between the ignition timing IG and the output torque Trq are calculated, and by a method of regression analysis such as the least square method, the coefficients A, B, C of respective terms may be calculated.

<If Ignition Sample Numbers are Two>

Alternatively, the ignition sample numbers may be preliminarily set to two. In this case, as shown in a next equation, the ignition torque approximated curve calculation unit 53 sets the first sample of ignition timing IG1 to the MBT ignition timing IGmbt which is the ignition timing when the output torque becomes the maximum, and sets the second sample of ignition timing IG2 to the retard limit ignition timing IGrtd which is the setting limit of the ignition timing on the retard side. Similarly to the ignition timing setting function, the MBT ignition timing IGmbt is calculated using a function in which a relationship between preliminarily set kinds of driving conditions and the MBT ignition timing IGmbt is preliminarily set; and the function is configured by a neural network. Alternatively, as mentioned above, if two FNN of FNN for calculation of the MBT ignition timing IGmbt and FNN for calculation of the knock limit ignition timing IGknk are provided as the ignition timing setting function, the MBT ignition timing IGmbt calculated when calculating the basic value of target ignition timing IGb may be used.

$$IG1 = IGmbt, \; IG2 = IGrtd \quad (5)$$

The plural ignition torque calculation unit 52 calculates the first sample of ignition corresponding torque Trqi1 corresponding to the MBT ignition timing IGmbt, by using the torque characteristics function, and calculates the second sample of ignition corresponding torque Trqi2 corresponding to the retard limit ignition timing IGrtd, by using a torque characteristics function.

Then, as shown in a next equation, the ignition torque approximated curve calculation unit 53 sets the first sample of ignition corresponding torque Trqi1 corresponding to the MBT ignition timing IGmbt, and the MBT ignition timing IGmbt, to extremums of the ignition torque approximated curve which is set to a the quadratic function.

$$Trq = A \times \left(IG + \frac{B}{2A}\right)^2 + C - \frac{B^2}{4A} \quad (6)$$

$$\frac{B}{2A} = -IGmbt, \; C - \frac{B^2}{4A} = Trqi1$$

Then, as shown in a next equation, the ignition torque approximated curve calculation unit 53 calculates the coefficients A, B, C of respective terms of the ignition torque approximated curve, based on the second sample of ignition corresponding torque Trqi2 corresponding to the retard limit ignition timing IGrtd, and the retard limit ignition timing IGrtd.

$$Trqi2 = A \times (IGrtd - IGmbt)^2 + Trqi1 \quad (7)$$

$$A = \frac{Trqi2 - Trqi1}{(IGrtd - IGmbt)^2}$$

-continued $$B = -IGmbt \times 2A$$

$$C = Trqi1 + \frac{B^2}{4A}$$

<Calculation of Target Torque Corresponding Ignition Timing Using Ignition Torque Approximated Curve>

As shown in a next equation, the approximated curve ignition calculation unit 54 calculates the ignition timing corresponding to the high response target torque Trqtf by solving the equation of the quadratic function and using the coefficient A, B, C, as the target torque corresponding ignition timing IGtt.

$$A \times IGtt^2 + B \times IGtt + (C - Trqtf) = 0 \quad (8)$$

$$IGtt = \frac{-B + \sqrt{B^2 - 4 \times A \times (C - Trqtf)}}{2 \times A}$$

2-2-5. Calculation of Target Charging Efficiency Ect

The torque interface unit 32 is provided with a target intake air amount calculation unit 61 that calculates the target charging efficiency Ect. The target intake air amount calculation unit 61 calculates the target charging efficiency Ect which realizes the target torque. In the present embodiment, the target intake air amount calculation unit 61 calculates the target charging efficiency Ect which realizes the low response target torque Trqts which is the output torque required for the internal combustion engine without considering retarding the ignition timing.

If the charging efficiency Ec is changed little by little and the output torque Trq is calculated repeatedly using the torque characteristics function, the charging efficiency Ec which realizes the low response target torque Trqt can be searched. In this case, since the basic value of target ignition timing IGb is also changed when the charging efficiency Ec is changed, it is necessary to also calculate the basic value of target ignition timing IGb using the ignition timing setting function every time when the charging efficiency Ec is changed. However, if the calculation using the torque characteristics function and the calculation using the ignition timing setting function are performed repeatedly, arithmetic load is increased. Especially, if system structure becomes complex, and the torque characteristics function and the ignition timing setting function become complex, arithmetic load is increased significantly. Therefore, it is desired to lower the number of calculations using the torque characteristics function and the ignition timing setting function as much as possible.

Figure 8:
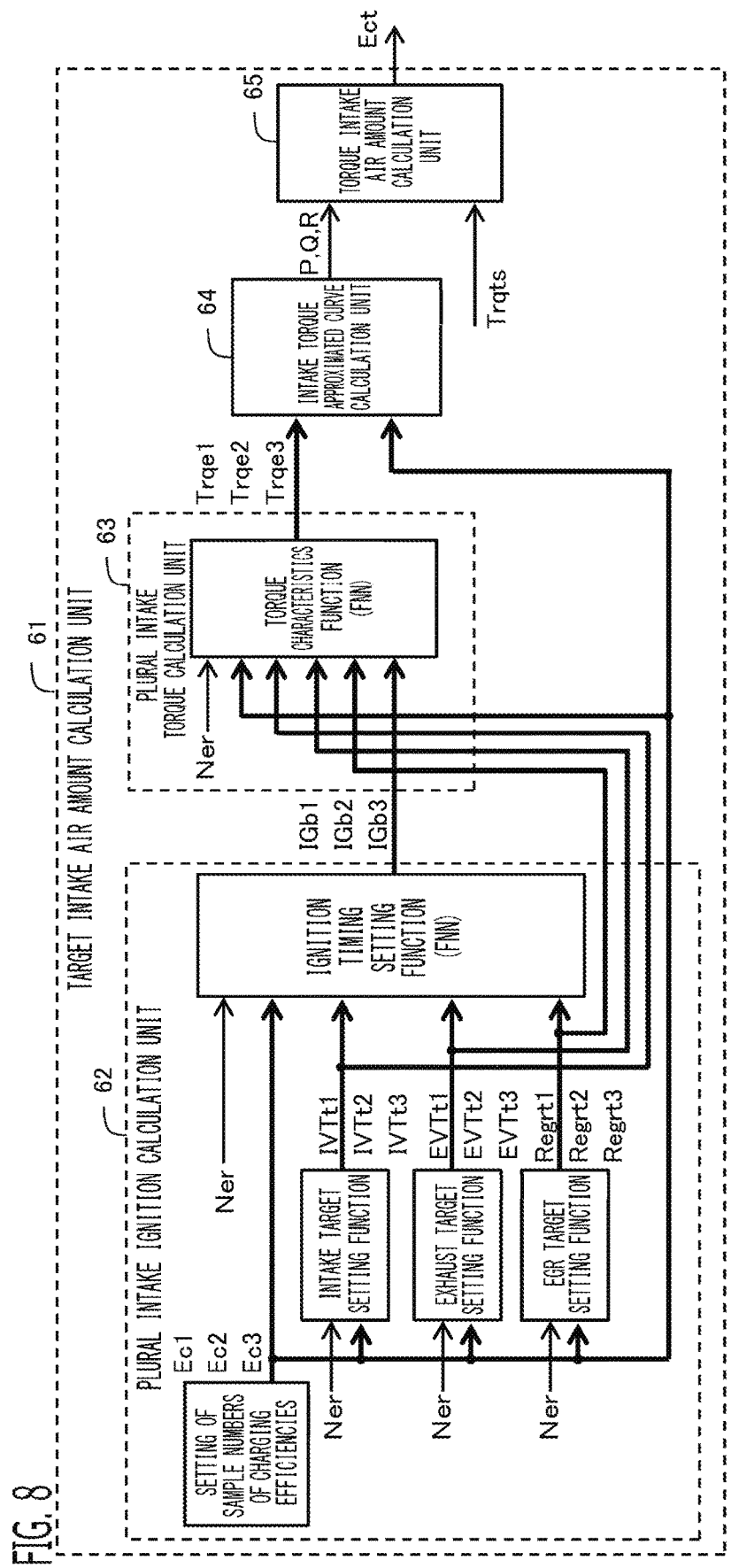
FIG. 8 is a block diagram for explaining calculation processing of a target charging efficiency according to Embodiment 1.

Then, as shown in FIG. 8, the target intake air amount calculation unit 61 is provided with a plural intake ignition calculation unit 62, a plural intake torque calculation unit 63, an intake torque approximated curve calculation unit 64, and a torque intake air amount calculation unit 65. The plural intake ignition calculation unit 62 calculates intake sample numbers of the basic values of target ignition timing IGb1, IGb2 . . . corresponding to the respective intake sample numbers of the charging efficiencies Ec1, Ec2 . . . which are preliminarily set to plural numbers, by using the ignition timing setting function.

The plural intake torque calculation unit 63 calculates the intake sample numbers of the intake ignition corresponding torques Trqe1, Trqe2 . . . which are the intake sample numbers of the output torques corresponding to the respective intake sample numbers of the charging efficiencies Ec1, Ec2 . . . and the respective intake sample numbers of the basic values of target ignition timing IGb1, IGb2 . . . , by using the torque characteristics function.

The intake torque approximated curve calculation unit 64 calculates an intake torque approximated curve which is an approximated curve approximating a relationship between the intake sample numbers of the charging efficiencies Ec1, Ec2 . . . and the intake sample numbers of the intake ignition corresponding torques Trqe1, Trqe2 . . . . The torque intake air amount calculation unit 65 calculates the charging efficiency corresponding to the target torque (in this example, the low response target torque Trqts), as the target charging efficiency Ect, by using the intake torque approximated curve.

According to this configuration, without performing the calculation using the torque characteristics function and the ignition timing setting function repeatedly to search the charging efficiency corresponding to the target torque directly, the approximated curve is calculated based on the intake sample numbers of calculation results of the torque characteristics function and the ignition timing setting function, and the charging efficiency corresponding to the target torque is calculated using the approximated curve, therefore the calculation using the torque characteristics function and the ignition timing setting function can be reduced to the preliminarily set intake sample numbers.

<Setting of Three Intake Sample Numbers of Charging Efficiencies>

In the present embodiment, a case where the intake sample numbers is set to three will be explained. As shown in a next equation, the plural intake ignition calculation unit 62 sets the actual charging efficiency Ecr to the first sample of charging efficiency Ec1. The plural intake ignition calculation unit 62 calculates a value according to a value obtained by multiplying a ratio of the low response target torque Trqts to the actual output torque Trqr, to the actual charging efficiency Ecr, as a target corresponding charging efficiency, and sets it to the third sample of charging efficiency Ec3. The plural intake ignition calculation unit 62 calculates an intermediate value between the actual charging efficiency Ecr (Ec1) and the target corresponding charging efficiency (Ec3), as a middle charging efficiency, and sets it to the second sample of charging efficiency Ec2.

$$Ec1 = Ecr \qquad (9)$$
$$Ec3 = Ke \times Ecr \times \frac{Trqts}{Trqr}$$
$$Ec2 = \frac{Ec1 + Ec3}{2}$$

Here, when "the actual output torque Trqr<the low response target torque Trqts", the adjustment factor Ke is set to a value about 1.2 to 1.5; and when "the actual output torque Trqr>the low response target torque Trqts", the adjustment factor Ke is set to a value about 0.7 to 0.9.

<Calculation of Target Values of Controlled Variables Other than Three Intake Sample Numbers of Ignition Timings>

If the charging efficiency Ec changes, not only the basic value of target ignition timing IGb but also the optimum values of other controlled variables of the internal combustion engines will change, and change of the controlled variables will influence on the output torque Trq. In the present embodiment, the plural intake ignition calculation unit 62 calculates target values of controlled variables of the internal combustion engines other than the ignition timing (in this example, the target intake phase angle IVTt, the target exhaust phase angle EVTt, the target EGR rate Regrt) corresponding to the respective intake sample numbers of the charging efficiencies Ec1, Ec2, Ec3, and uses these for the calculation using the ignition timing setting function.

Specifically, the plural intake ignition calculation unit 62 calculates the intake sample numbers of the target intake phase angles IVTt1, IVTt2, IVTt3 corresponding to the actual rotational speed Ner and the respective intake sample numbers of the charging efficiencies Ec1, Ec2, Ec3, by using an intake phase angle target setting function described below. The plural intake ignition calculation unit 62 calculates the intake sample numbers of the target exhaust phase angles EVTt1, EVTt2, EVTt3 corresponding to the actual rotational speed Ner and the respective intake sample numbers of the charging efficiencies Ec1, Ec2, Ec3, by using an exhaust phase angle target setting function described below. The plural intake ignition calculation unit 62 calculates the intake sample numbers of the target EGR rates Regrt1, Regrt2, Regrt3 corresponding to the actual rotational speed Ner and the respective intake sample numbers of the charging efficiencies Ec1, Ec2, Ec3, by using an EGR rate target setting function described below.

<Calculation of Three Intake Sample Numbers of Basic Values of Target Ignition Timing>

The plural intake ignition calculation unit 62 calculates the first sample of the basic value of target ignition timing IGb1 corresponding to the actual rotational speed Ner, the first sample of the charging efficiency Ec1, the first sample of the target intake phase angle IVTt1, the first sample of the target exhaust phase angle EVTt1, and the first sample of the target EGR rate Regrt1, by using the ignition timing setting function. Next, the plural intake ignition calculation unit 62 calculates the second sample of the basic value of target ignition timing IGb2 corresponding to the actual rotational speed Ner, the second sample of the charging efficiency Ec2, the second sample of the target intake phase angle IVTt2, the second sample of the target exhaust phase angle EVTt2, and the second sample of the target EGR rate Regrt2, by using the ignition timing setting function. Then, the plural intake ignition calculation unit 62 calculates the third sample of the basic value of target ignition timing IGb3 corresponding to the actual rotational speed Ner, the third sample of the charging efficiency Ec3, the third sample of the target intake phase angle IVTt3, the third sample of the target exhaust phase angle EVTt3, and the third sample of the target EGR rate Regrt3, by using the ignition timing setting function.

<Calculation of Three Intake Sample Numbers of Intake Ignition Corresponding Torques>

The plural intake torque calculation unit 63 calculates the first sample of the intake ignition corresponding torque Trqe1 corresponding to the actual rotational speed Ner, the first sample of the charging efficiency Ec1, the first sample of the target intake phase angle IVTt1, the first sample of the target exhaust phase angle EVTt1, the first sample of the target EGR rate Regrt1, and the first sample of the basic value of target ignition timing IGb1, by using the torque characteristics function. Next, the plural intake torque calculation unit 63 calculates the second sample of the intake ignition corresponding torque Trqe2 corresponding to the actual rotational speed Ner, the second sample of the charging efficiency Ec2, the second sample of the target intake phase angle IVTt2, the second sample of the target exhaust phase angle EVTt2, the second sample of the target EGR rate Regrt2, and the second sample of the basic value of target ignition timing IGb2, by using the torque characteristics function. Then, the plural intake torque calculation unit 63 calculates the third sample of the intake ignition corresponding torque Trqe3 corresponding to the actual rotational speed Ner, the third sample of the charging efficiency Ec3, the third sample of the target intake phase angle IVTt3, the third sample of the target exhaust phase angle EVTt3, the third sample of the target EGR rate Regrt3, and the third sample of the basic value of target ignition timing IGb3, by using the torque characteristics function.

<Calculation of Intake Torque Approximated Curve>

Figure 9:
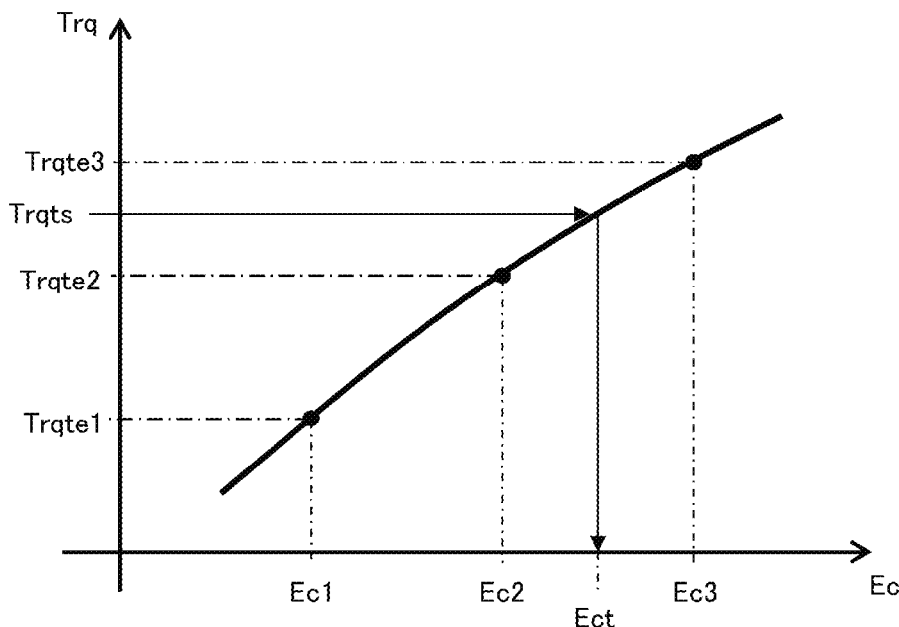
FIG. 9 is a figure for explaining an intake torque approximated curve according to Embodiment 1.

The relationship between the first sample to the third sample of the charging efficiencies Ec1, Ec2, Ec3, and the first sample to the third sample of the intake ignition corresponding torques Trqe1, Trqe2, Trqe3 is shown in FIG. 9. Generally, if the thermal efficiency is constant, the relationship between the charging efficiency and the output torque is proportional. However, since the thermal efficiency also changes if the ignition timing, the VVT phase angle, and the EGR rate change, it is considered that it is not proportional relationship strictly. Therefore, approximate precision will be increased if approximated by a quadratic function.

Then, in the present embodiment, the intake torque approximated curve is set to a quadratic function as shown in a next equation. The intake torque approximated curve calculation unit 64 calculates coefficients P, Q, R of respective terms of the intake torque approximated curve which is set to a quadratic function, based on the intake sample numbers of the charging efficiencies Ec1, Ec2 . . . and the intake sample numbers of the intake ignition corresponding torques Trqe1, Trqe2 . . . .

$$Trq = P \times Ec^2 + Q \times Ec + R \tag{10}$$

In this quadratic function, if there are three points of relationship between the charging efficiency Ec and the output torque Trq, the three coefficients P, Q, R can be calculated by substituting these to the equation (10) respectively and solving simultaneous equations. For example, the intake torque approximated curve calculation unit 64 calculates the three coefficients P, Q, R using a next equation.

$$\begin{bmatrix} P \\ Q \\ R \end{bmatrix} = \begin{bmatrix} Ec1^2 & Ec1 & 1 \\ Ec2^2 & Ec2 & 1 \\ Ec3^2 & Ec3 & 1 \end{bmatrix}^{-1} \begin{bmatrix} Trqe1 \\ Trqe2 \\ Trqe3 \end{bmatrix} \tag{11}$$

The intake sample numbers may be preliminarily set to four or more numbers, four or more points of the relationship between the charging efficiency Ec and the output torque Trq are calculated, and by a method of regression analysis such as the least square method, the coefficients P, Q, R of respective terms may be calculated.

<Calculation of Target Charging Efficiency Using Intake Torque Approximated Curve>

As shown in a next equation, the torque intake air amount calculation unit 65 calculates the charging efficiency corresponding to the low response target torque Trqts by solving the equation of the quadratic function and using the coefficients P, Q, R of respective terms, as the target charging efficiency Ect.

$$P \times Ect^2 + Q \times Ect + (R - Trqts) = 0 \tag{12}$$

$$Ect = \frac{-Q + \sqrt{Q^2 - 4 \times P \times (R - TRqts)}}{2 \times P}$$

2-2-6. Calculation of Target Value of Combustion Control State

The torque interface unit 32 is provided with a combustion control target calculation unit 66 that calculates a target value of a combustion control state which is a control state of the combustion operation mechanism. As shown in FIG. 10, the combustion control target calculation unit 66 calculates the target value of the combustion control state, by using a combustion control target setting function in which a relationship between preliminarily set kinds of driving conditions and the target value of the combustion control state is set. In the present embodiment, the target EGR rate Regrt, the target intake phase angle IVTt, and the target exhaust phase angle EVTt are calculated as the target value of the combustion control state; and an EGR rate target setting function, an intake phase angle target setting function, and an exhaust phase angle target setting function are used as the combustion control target setting function.

The combustion control target calculation unit 66 calculates the target EGR rate Regrt corresponding to the actual rotational speed Ner and the target charging efficiency Ect, by using the EGR rate target setting function in which a relationship among the rotational speed Ne, the charging efficiency Ec, and the target EGR rate Regrt is preliminarily set. In the present embodiment, the EGR rate target setting function is configured by map data. The EGR rate target setting function may be configured by a neural network.

The combustion control target calculation unit 66 calculates the target intake phase angle IVTt corresponding to the actual rotational speed Ner and the target charging efficiency Ect, by using the intake phase angle target setting function in which a relationship among the rotational speed Ne, the charging efficiency Ec, and the target intake phase angle IVTt is preliminarily set. In the present embodiment, the intake phase angle target setting function is configured by map data. The intake phase angle target setting function may be configured by a neural network.

The combustion control target calculation unit 66 calculates the target exhaust phase angle EVTt corresponding to the actual rotational speed Ner and the target charging efficiency Ect, by using the exhaust phase angle target setting function in which a relationship among the rotational speed Ne, the charging efficiency Ec, and the target exhaust phase angle EVTt is preliminarily set. In the present embodiment, the exhaust phase angle target setting function is configured by map data. The exhaust phase angle target setting function may be configured by a neural network.

2-3. Flowchart

Figure 11:
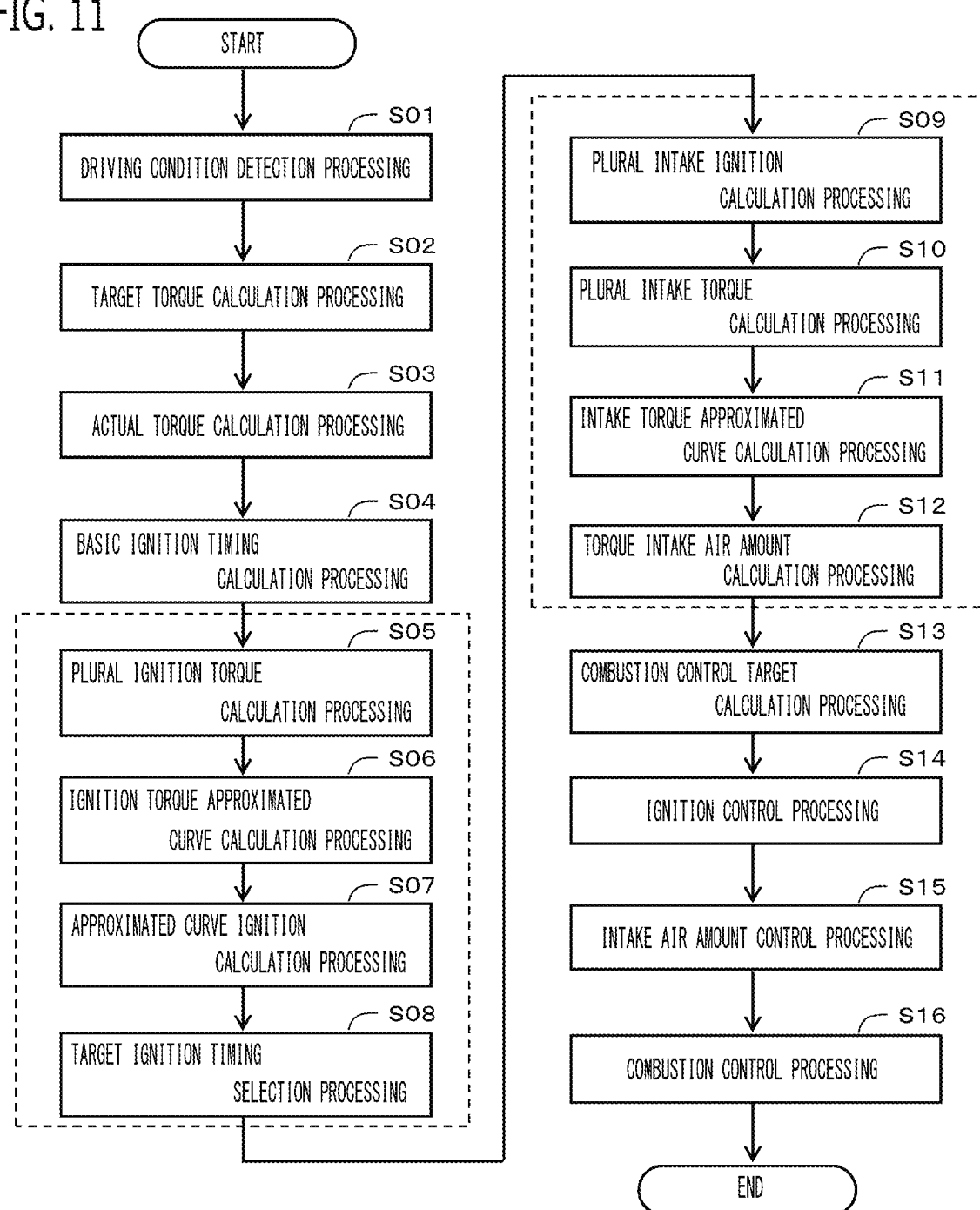
FIG. 11 is a flowchart for explaining calculation processing of target ignition timing and target charging efficiency according to Embodiment 1.

The procedure (the control method of the internal combustion engine 1) of schematic processing of the controller 30 concerning calculation of the target ignition timing IGt and the target charging efficiency Ect will be explained based on the flow chart shown in FIG. 11. The processing represented in the flowchart in FIG. 11 is recurrently implemented, for example, every predetermined operation cycle while the computing processing unit 90 implements software (a program) stored in the storage apparatus 91.

In the step S01, as mentioned above, the driving condition detection unit 330 implements driving condition detection processing that detects various kinds of driving conditions, such as the actual rotational speed Ner of the internal combustion engine and the actual charging efficiency Ecr as the in-cylinder intake air amount information. In the step S02, as mentioned above, the torque control unit 31 implements target torque calculation processing that calculates the target torque (in this example, the low response target torque Trqts, the high response target torque Trqtf). In the step S03, as mentioned above, the actual torque calculation unit 55 implements actual torque calculation processing that calculates the actual output torque Trqr corresponding to the present driving conditions, by using the torque characteristics function. In the step S04, as mentioned above, the target ignition timing calculation unit 51 implements basic ignition timing calculation processing that calculates the basic value of target ignition timing IGb corresponding to the present driving conditions, by using the ignition timing setting function.

In the step S05, as mentioned above, the plural ignition torque calculation unit 52 implements plural ignition torque calculation processing that calculates ignition sample numbers of ignition corresponding torques Trqi1, Trqi2 . . . which are the ignition sample numbers of output torques corresponding to the respective ignition sample numbers of ignition timings IG1, IG2 . . . , by using the torque characteristics function. In the step S06, as mentioned above, the ignition torque approximated curve calculation unit 53 implements ignition torque approximated curve calculation processing that calculates an ignition torque approximated curve approximating a relationship between the ignition sample numbers of the ignition timings IG1, IG2 . . . and the ignition sample numbers of the ignition corresponding torques Trqi1, Trqi2 . . . . In the step S07, as mentioned above, the approximated curve ignition calculation unit 54 implements approximated curve ignition calculation processing that calculates the ignition timing corresponding to the target torque (in this example, the high response target torque Trqtf), as the target torque corresponding ignition timing IGtt, by using the ignition torque approximated curve.

In the step S08, as mentioned above, the target ignition timing calculation unit 51 implements target ignition timing selection processing that calculates the basic value of target ignition timing IGb calculated in the step S04 as the target ignition timing IGt when there is no torque down request by retarding ignition timing; and calculates the target torque corresponding ignition timing IGtt calculated in the step S07 as the target ignition timing IGt when there is the torque down request by retarding ignition timing.

In the step S09, as mentioned above, the plural intake ignition calculation unit 62 implements plural intake ignition calculation processing that calculates the intake sample numbers of the basic values of target ignition timing IGb1, IGb2 . . . corresponding to the respective intake sample numbers of the charging efficiencies Ec1, Ec2 . . . which are preliminarily set to plural numbers, by using the ignition timing setting function. In the step S10, as mentioned above, the plural intake torque calculation unit 63 implements plural intake torque calculation processing that calculates the intake sample numbers of the intake ignition corresponding torques Trqe1, Trqe2 . . . which are the intake sample numbers of output torques corresponding to the respective intake sample numbers of the charging efficiencies Ec1, Ec2 . . . and the respective intake sample numbers of the basic values of target ignition timing IGb1, IGb2 . . . , by using the torque characteristics function.

In the step S11, as mentioned above, the intake torque approximated curve calculation unit 64 implements intake torque approximated curve calculation processing that calculates the intake torque approximated curve approximating a relationship between the intake sample numbers of the charging efficiencies Ec1, Ec2 . . . and the intake sample numbers of the intake ignition corresponding torques Trqe1, Trqe2 . . . . In the step S12, as mentioned above, the torque intake air amount calculation unit 65 implements torque intake air amount calculation processing that calculates the charging efficiency corresponding to the target torque (in this example, the low response target torque Trqts), as the target charging efficiency Ect, by using the intake torque approximated curve. In the step S13, as mentioned above, the combustion control target calculation unit 66 implements combustion control target calculation processing that calculates the target value of the combustion control state (in this example, the target EGR rate Regrt, the target intake phase angle IVTt, and the target exhaust phase angle EVTt), by using the combustion control target setting function.

In the step S14, as mentioned above, the ignition control unit 333 implements ignition control processing that determines the final ignition timing SA based on the target ignition timing IGt, and performs energization control to the ignition coil 16 based on the final ignition timing SA. In the step S15, as mentioned above, the intake air amount control unit 331 implements intake air amount control processing that controls the air amount taken into the cylinder based on the target charging efficiency Ect. In the step S16, as mentioned above, the combustion control unit 334 implements combustion control processing that performs driving control of electric actuators of the EGR valve 22, the intake VVT 14, and the exhaust VVT 15, based on the target EGR rate Regrt, the target intake phase angle IVTt, and the target exhaust phase angle EVTt.

Other Embodiments

Lastly, other embodiments of the present disclosure will be explained. Each of the configurations of embodiments to be explained below is not limited to be separately utilized but can be utilized in combination with the configurations of other embodiments as long as no discrepancy occurs.

(1) In the above-mentioned Embodiment 1, there has been explained the case where the torque characteristics function and the ignition timing setting function are configured by the neural network. However, embodiments of the present disclosure are not limited to the foregoing case. That is to say, one or both of the torque characteristics function and the ignition timing setting function may be configured by other functions, such as map data and an approximated curve.

(2) In the above-mentioned Embodiment 1, there has been explained the case where the combustion control target setting functions, such as the EGR rate target setting function, the intake phase angle target setting function, and the exhaust phase angle target setting function, are configured by map data. However, embodiments of the present disclosure are not limited to the foregoing case. That is to say, each combustion control target setting function may be configured by other functions, such as a neural network.

(3) In the above-mentioned Embodiment 1, there has been explained the case where the combustion operation mechanisms are the intake VVT 14, the exhaust VVT 15, and the EGR valve 22; the target intake phase angle IVTt, the target exhaust phase angle EVTt, and the target EGR rate Regrt are calculated as the target value of the combustion control state; and the intake phase angle target setting function, the exhaust phase angle target setting function, and the EGR rate target setting function are used as the control target setting function. However, embodiments of the present disclosure are not limited to the foregoing case. That is to say, the combustion operation mechanism may be changed depending on the system structure of the internal combustion engine, and may be a variable valve lift mechanism, a variable compression ratio mechanism, a turbocharger, a swirl control valve, a tumble control valve, and the like; the target value of the combustion control state may be a target valve lifting amount, a target compression ratio, a target supercharging pressure, a target swirl control valve opening degree, a target tumble control valve opening degree, and the like; and the control target setting function may be a function which sets each target value.

(4) In the above-mentioned Embodiment 1, there has been explained the case where the internal combustion engine 1 is a gasoline engine. However, embodiments of the present disclosure are not limited to the foregoing case. That is to say, the internal combustion engine 1 may be various kinds of internal combustion engines, such as an engine which performs HCCI combustion (Homogeneous-Charge Compression Ignition Combustion).

Although the present disclosure is described above in terms of an exemplary embodiment, it should be understood that the various features, aspects and functionality described in the embodiment are not limited in their applicability to the particular embodiment with which they are described, but instead can be applied, alone or in various combinations to the embodiment. It is therefore understood that numerous modifications which have not been exemplified can be devised without departing from the scope of the present disclosure. For example, at least one of the constituent components may be modified, added, or eliminated.

What is claimed is:

1. A controller for an internal combustion engine comprising at least one processor configured to implement:
a plural ignition torque calculator configured to:
calculate a plurality of preliminary ignition timing values (IG), wherein ignition sample numbers include the preliminary ignition timing values (IG), and
calculate in real time a plurality of ignition corresponding torque values (Trqi), corresponding to the respective preliminary ignition timing values (IG) and current driving conditions except an ignition timing, by using a torque characteristics function representing a relationship between preliminarily set driving conditions including the ignition timing and output torque of the internal combustion engine, wherein the relationship depends on ignition timing and wherein the ignition sample numbers include the plurality of ignition corresponding torque values (Trqi);
an ignition torque approximated curve calculator configured to calculate an ignition torque approximated curve, wherein the ignition torque approximated curve approximates a relationship between the plurality of preliminary ignition timing values (IG), and the plurality of ignition corresponding torque values (Trqi);
an approximated curve ignition calculator configured to calculate a target ignition timing corresponding to a target torque, wherein the target torque is an output torque required for the internal combustion engine, by using the ignition torque approximated curve; and
an ignition controller configured to perform energization control of an ignition coil, based on the target ignition timing,
wherein the ignition torque approximated curve calculator is configured to calculate in real time coefficients of respective terms of the ignition torque approximated curve which is set to a quadratic function so as to approximate the relation between the plurality of preliminary ignition timing values (IG) and the plurality of ignition corresponding torque values (Trqi), based on the plurality of preliminary ignition timing values (IG), and the plurality of ignition corresponding torque values (Trqi), and
wherein the only independent variable in the quadratic function is the ignition timing value (IG).

2. The controller for the internal combustion engine according to claim 1, wherein the torque characteristics function is configured by a neural network.

3. The controller for the internal combustion engine according to claim 1, wherein a number of the ignition sample numbers is preliminarily set to greater than or equal to three.

4. The controller for the internal combustion engine according to claim 1,
wherein a number of the ignition sample numbers is preliminarily set to two,
wherein the plural ignition torque calculator is further configured to use a maximum torque ignition timing which is the ignition timing when the output torque becomes the maximum, and a retard limit ignition timing which is a setting limit of the ignition timing on a retard side, as the plurality of ignition corresponding torque values (Trqi), and
wherein the ignition torque approximated curve calculator is configured to set the maximum torque ignition timing and the ignition corresponding torque corresponding to the maximum torque ignition timing, to extremums of the ignition torque approximated curve which is set to a quadratic function; and calculate coefficients of respective terms of the ignition torque approximated curve, based on the retard limit ignition timing and the ignition corresponding torque corresponding to the retard limit ignition timing.

5. The controller for the internal combustion engine according to claim 1, wherein the target torque is an output torque required for the internal combustion engine including retarding the ignition timing.

6. The controller of claim 1, wherein the approximated curve ignition calculator is further configured to determine three coefficients A, B, and C, wherein the ignition torque approximated curve depends on A, B, and C.

7. The controller of claim 6, wherein a number of the plurality of ignition corresponding torque values, Trqi, includes three values, Trq1, Trq2, and Trq3, and the approximated curve ignition calculator is further configured to determine the three coefficients A, B, and C by solving simultaneous equations.

8. The controller of claim 6, wherein the approximated curve ignition calculator is further configured to determine the three coefficients A, B, and C by applying an inverted matrix to a vector, wherein the vector includes the plurality of ignition corresponding torque values, Trqi.

9. The controller of claim 6, wherein a number of the plurality of ignition corresponding torque values, Trqi, includes only two values among a large number of values on an axis representing torque, Trq1, and Trq2.

10. The controller of claim 6,
wherein the quadratic function is $Trq=A \times IG^2+B \times IG+C$, and
wherein x is the multiplication operator, + is the addition operator, and Trq is dependent variable represent torque.

11. A control method for an internal combustion engine comprising:
calculating a plurality of preliminary ignition timing values (IG), wherein the ignition sample numbers include the preliminary ignition timing values (IG);
calculating in real time a plurality of ignition corresponding torque values (Trqi), corresponding to the respective preliminary ignition timing values (IG) and current driving conditions except an ignition timing, by using a torque characteristics function representing a relationship between preliminarily set driving conditions including the ignition timing and output torque of the internal combustion engine, wherein the relationship depends on ignition timing and wherein the ignition sample numbers include the plurality of ignition corresponding torque values (Trqi);
calculating an ignition torque approximated curve, wherein the ignition torque approximated curve approximates a relationship between the plurality of preliminary ignition timing values (IG), and the plurality of ignition corresponding torque values (Trqi);
calculating a target ignition timing corresponding to a target torque, wherein the target torque is an output torque required for the internal combustion engine, by using the ignition torque approximated curve; and
performing energization control of an ignition coil, based on the target ignition timing,
wherein in the calculating an ignition torque approximated curve, calculating in real time coefficients of respective terms of the ignition torque approximated curve which is set to a quadratic function so as to approximate the relation between the plurality of preliminary ignition timing values (IG) and the plurality of ignition corresponding torque values (Trqi), based on the plurality of preliminary ignition timing values (IG), and the plurality of ignition corresponding torque values (Trqi), and
wherein the only independent variable in the quadratic function is the ignition timing value (IG).

12. The control method of claim 11,
wherein the ignition torque approximated curve depends on A, B, and C,
wherein the quadratic function is $Trq=A \times IG^2+B \times IG+C$, and
wherein x is the multiplication operator, + is the addition operator, and Trq is dependent variable represent torque.

* * * * *